(12) United States Patent
Nishizawa et al.

(10) Patent No.: US 6,240,257 B1
(45) Date of Patent: May 29, 2001

(54) FINDER APPARATUS

(75) Inventors: Akio Nishizawa, Yokohama; Kiyosada Machida, Urawa, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/507,748

(22) Filed: Feb. 22, 2000

Related U.S. Application Data

(63) Continuation of application No. 09/262,008, filed on Mar. 4, 1999, now abandoned.

(30) Foreign Application Priority Data

Mar. 5, 1998 (JP) .................................................. 10-053846
Mar. 5, 1998 (JP) .................................................. 10-053847

(51) Int. Cl.$^7$ .................................................. G03B 17/20
(52) U.S. Cl. ..................... 396/287; 396/296; 396/378
(58) Field of Search .................................. 396/287, 296, 396/288, 378, 435, 436, 373

(56) References Cited

U.S. PATENT DOCUMENTS

| | | | |
|---|---|---|---|
| 4,576,458 | 3/1986 | Cho et al. | 396/147 |
| 5,666,576 | 9/1997 | Ohtake | 396/288 |
| 5,752,107 | 5/1998 | Hasushita et al. | 396/296 |
| 5,930,539 | 7/1999 | Tanaka | 396/278 |
| 6,002,887 | * 12/1999 | Chiba et al. | 396/296 X |

* cited by examiner

*Primary Examiner*—W. B. Perkey

(57) ABSTRACT

Equipped with a display element which displays a visual field frame in the picture plane by means of obstructing the subject light beam, and which is formed from material which scatters light, and irradiation means which irradiates light to the said display element. When the irradiation means is caused to operate, because its light is scattered by the display element and guided to the eyepiece side, the display element can namely cause the visual field frame portion to shine brightly.

20 Claims, 28 Drawing Sheets

FINDER APPARATUS

This application is a continuation of application Ser. No. 09/262,008, filed Mar. 4, 1999, now abandoned.

BACKGROUND OF THE INVENTION

1. Field of the Invention

The present invention relates to a viewfinder device which displays a visual field frame by a liquid crystal or the like in a picture plane.

2. Description of the Related Art

Those are known which dispose a visual field frame in the light path of a real image viewfinder, forming a viewfinder visual field by means of obstructing the peripheral portion of a subject light beam. In this kind of prior art device, the visual field frame portion, by means of displaying a blacked-out configuration, can be clearly recognized if the subject luminosity is bright, but in a case that the subject luminosity is dark, the boundary of the visual field frame and the visual field becomes indistinct, and this can become an obstacle to setting the composition.

SUMMARY OF THE INVENTION

The present invention has as its object to provide a viewfinder device with which, regardless of the luminosity of the subject, it is possible to clearly identify the visual field.

When described in correspondence with FIGS. 3 and 4, which show one embodiment, a first invention, equipped with a display element 11 (11a–11d) which displays a visual field frame in the picture plane by means of obstructing the subject light beam, consisting of a material which scatters light, and irradiating means 14 which irradiates light to the display element 11, constituted such that light from the irradiating means 14 being scattered by the display element so as to be passed through to the eyepiece side, by this means solves the abovementioned problem.

The second invention is equipped with a first display element 11a which displays a first visual field frame in a picture plane by means of obstructing the subject light beam, consisting of a material which scatters light, and a second display element 11b–11d which displays a second visual field frame in the visual field frame defined by the first visual field frame by means of obstructing the subject light beam, consisting of a material which scatters light when in a light obstructing state, and is capable of changing over between a light transmitting state and a light obstructing state, and a changeover means 62 which changes over the second display element 11b–11d between a light obstructing state and a light transmitting state, and an irradiation means 14 which irradiates light to the first and second display elements; and is constituted such that the light from the irradiation means 14, scattered by the first and second display elements 11a–11d, is guided toward the eyepiece side.

When described in correspondence with FIG. 12, the third invention is equipped with a first visual field frame display element 11a' which, consisting of a material which scatters light, displays a first visual field frame in a picture plane by means of obstructing the subject light beam, and a second visual field frame display element 11b–11d which, consisting of a material which scatters light when in a light obstructing state, displays a second visual field frame in the visual field frame defined by the first visual field frame by means of obstructing the subject light beam, and is capable of changing over between a light transmitting state and a light obstructing state, and, consisting of the same material as the second visual field frame display element, and a first warning display means 11e arranged in a clearance formed notching a portion of the first visual field frame display element 11a', and a second warning display element 11e' which performs a warning similar to the first warning display element 11e and is arranged in a clearance formed by cutting out a portion of the second visual field frame display element 11b–11d, and a changeover means 62 (FIG. 4) which changes over the second display element 11b–11d and the first and second warning display elements 11e, 11e' between a light obstructing state and a light transmitting state, and a control means 61 which controls the changeover means 62 such that, in the case that a warning is performed when the second visual field frame display element is in the transmitting state, the first warning display element is set as a light obstructing state and the second warning display element 11e' as a light transmitting state, in the case that a warning is performed when the second visual field frame display element is in the light obstructing state, the second warning display element 11e' is set in a light obstructing state.

The fourth invention is equipped with a light obstructing visual field frame member 4, which has an aperture in order to form a visual field in a viewfinder picture plane and, consisting of a material which scatters light, a display element 11b for visual field frame use, disposed more on the eyepiece side than the visual field frame member 4, and a light guide member 14 which guides light to the display element 11b. The display element 11b, when seen from the eyepiece side, positioning in the neighborhood of the boundary portion with the visual frame within the region obstructed by means of the visual field frame member 4, light guided by the light guide means 14 is guided to the eyepiece side, scattered by the display element 11b.

The fifth invention is equipped with a visual field frame member 4 which has an aperture in order to form a visual field in a viewfinder picture plane and, consisting of a material which scatters light, a display element 11e for visual field frame use, disposed more on the eyepiece side than the visual field frame member 4, and a light guide member 14 which guides light to the display element 11e. The display element 11e, when seen from the eyepiece side, its one portion is covered by means of the visual field frame member 4, and the other portion is positioned such as to expose from the aperture of the visual field frame member 4, is constituted such that light from the light guiding means 14, and scattered by the display element 11e, is guided to the eyepiece side.

DESCRIPTION OF THE PREFERRED EMBODIMENTS

First Embodiment

A first embodiment of the present invention is described with the aid of FIGS. 1–7.

Figure 1:
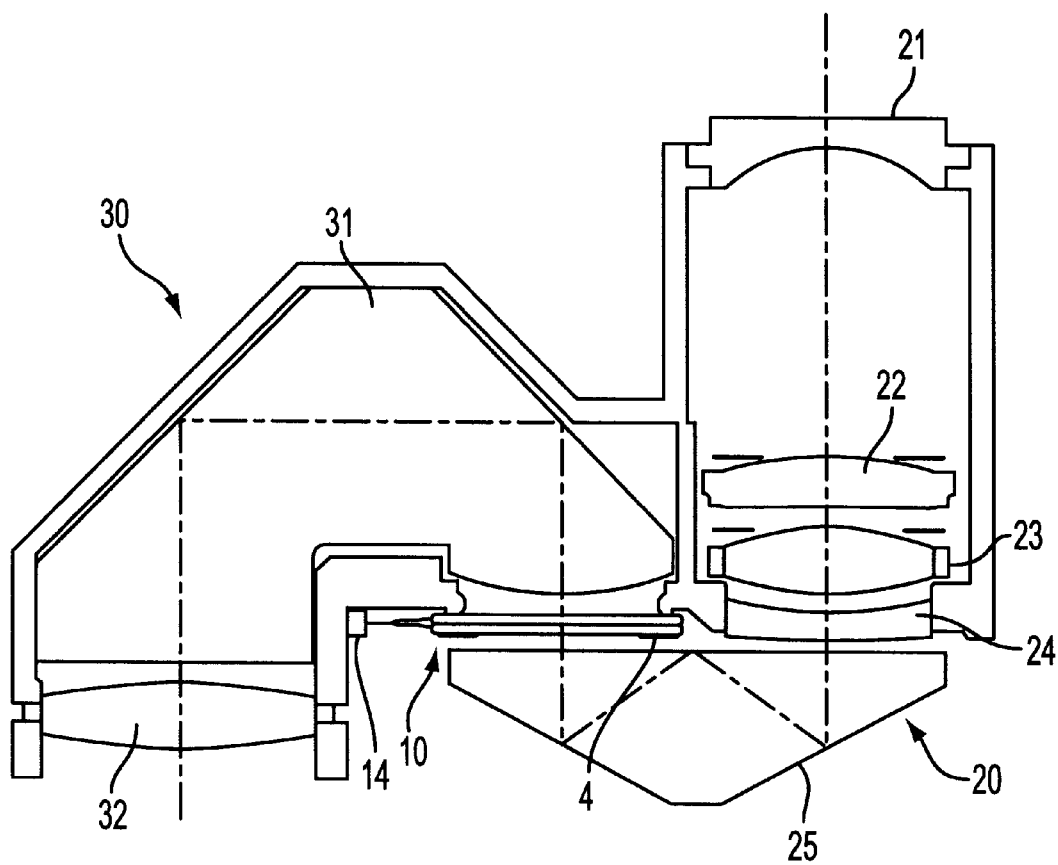
FIG. 1 is a cross sectional plan view showing the constitution of a viewfinder device in an embodiment of the present invention.

FIG. 1 is a cross sectional plan view showing a viewfinder device of a camera in this embodiment. The viewfinder device has an objective optical system 20 consisting of lenses 21–24 and prism 25, an eyepiece optical system 30 consisting of a prism 31 and lens 32, and a display unit 10 arranged between the two optical systems 20, 30.

Figure 2:
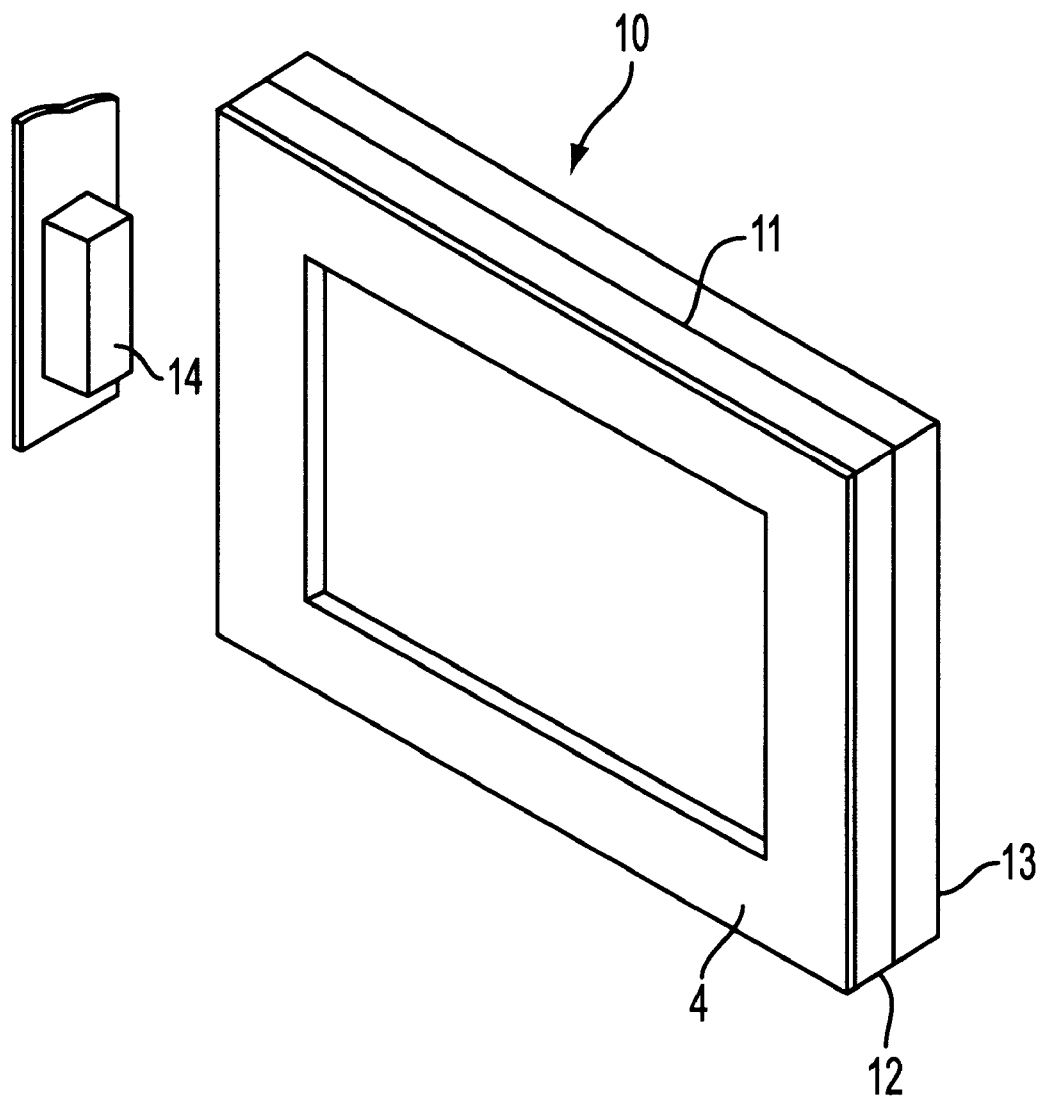
FIG. 2 is a perspective drawing showing the arrangement of the display unit 10 and the visual field frame member 4.

The display unit 10 is in order to form 3 kinds of visual field, as described hereinafter, within the viewfinder picture plane, and is constituted, as shown in FIG. 2, from a display element 11 (described in detail hereinafter) consisting of a macromolecular dispersion type liquid crystal, and 2 transparent glass plates 12, 13 (FIG. 2) with the display element 11 interposed between them, and LED 14 which has been disposed in the side portion of the glass plates 12, 13. A visual field frame member 4 is arranged so as to cover the surface of the glass plate 12 on the objective side of the display unit 10, and light is guided to the objective side only through the central aperture of the visual field frame member 4. The width to height ratio of the central aperture is according to the largest standard visual frame among 3 kinds of visual field.

Figure 3:
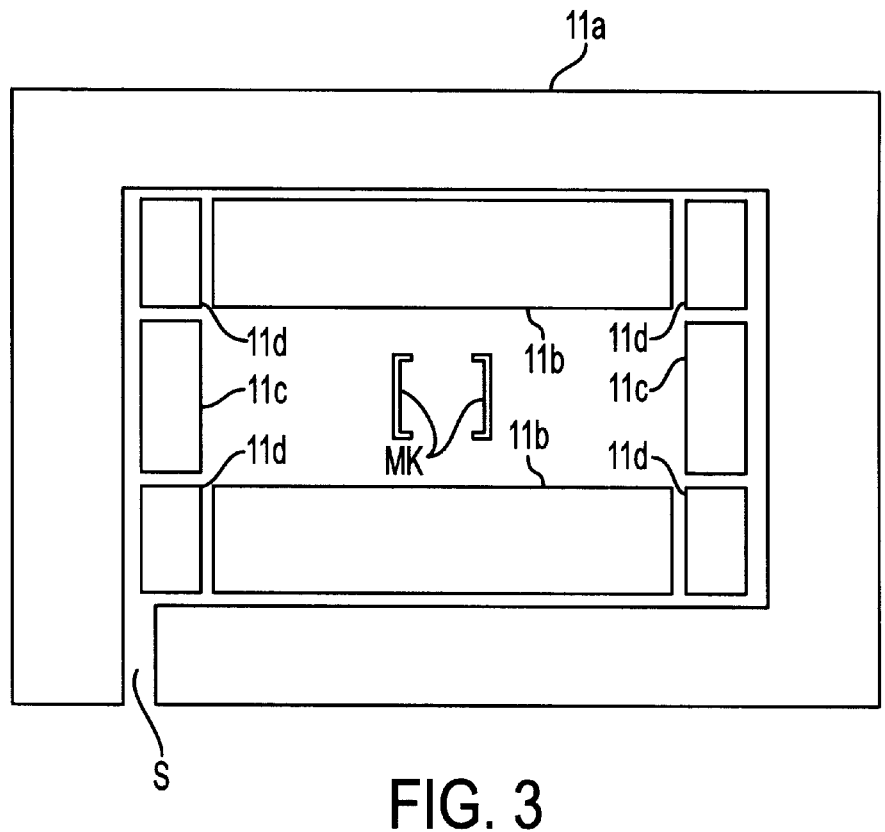
FIG. 3 is a diagram showing the viewfinder picture plane in a first embodiment.

FIG. 3 shows a viewfinder picture plane seen from the eyepiece side. Three kinds of visual frame are defined by means of the visual field frame member 4 and the display element 11 of the display unit 10. The display element 11 is dispersed into an element 11a in order to define a standard visual field, and elements 11b which obstruct light in the upper and lower portions of the standard visual field, and elements 11c which obstruct light in the left-hand and right-hand portions, and elements 11d which obstruct light in the corners (4 places) between the elements 11b; the inside portion of the outermost element 11a is superposed on the central aperture of the visual field frame member 4.

With the exception of element 11a, each element 11b–11d maintains a light obstructing state when a drive signal is not applied, and becomes in a light transmitting state (transparent) when a drive signal is applied. A drive signal is not applied to the element 11a, and it normally maintains a light obstructing state. A clearance S of the element 11a is disposed lower left in the drawing; wiring members (not shown in the drawing) are connected to each element along this clearance 2 [sic] in order to apply drive signals to the elements 11b–11d. FIG. 3 shows the state in which the drive signals to all the elements are interrupted; this becomes the state when the main switch (not shown in the drawing) of the camera is OFF.

When the LED 14 lights, its light is guided to the elements 11a–11d via the glass plates 12, 13. Because the elements 11a–11d are constituted by macromolecular dispersion type liquid crystals, when irradiated by LED light when in the light obstructing state, they scatter this light and guide it toward the eyepiece; because of this, the portion of each element is seen to be shining clearly. Furthermore, a mark MK showing a rangefinding area is normally displayed in the picture plane central portion.

Figure 4:
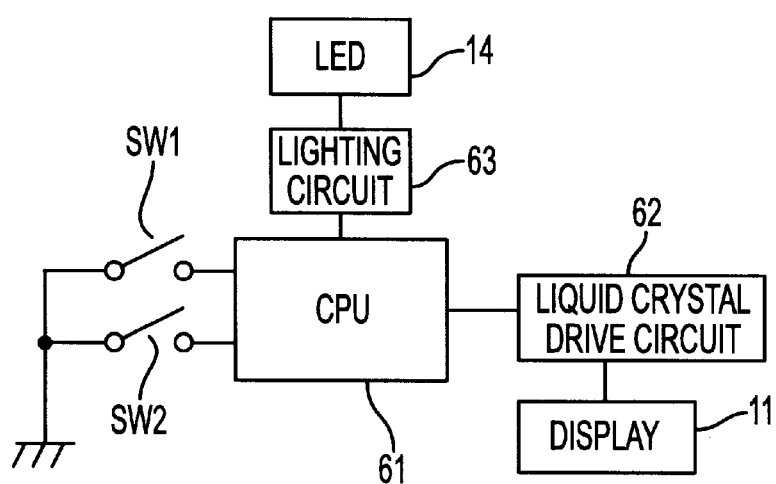
FIG. 4 is a block diagram of a control system.

FIG. 4 shows the constitution of a control system; a liquid crystal drive circuit 62 which applies drive signals to the display element 11, and a lighting circuit 63 of the LED 14, and a lighting switch SW1 for the LED 14, and a visual frame changeover switch SW2, are connected to a CPU 61.

Figure 6:
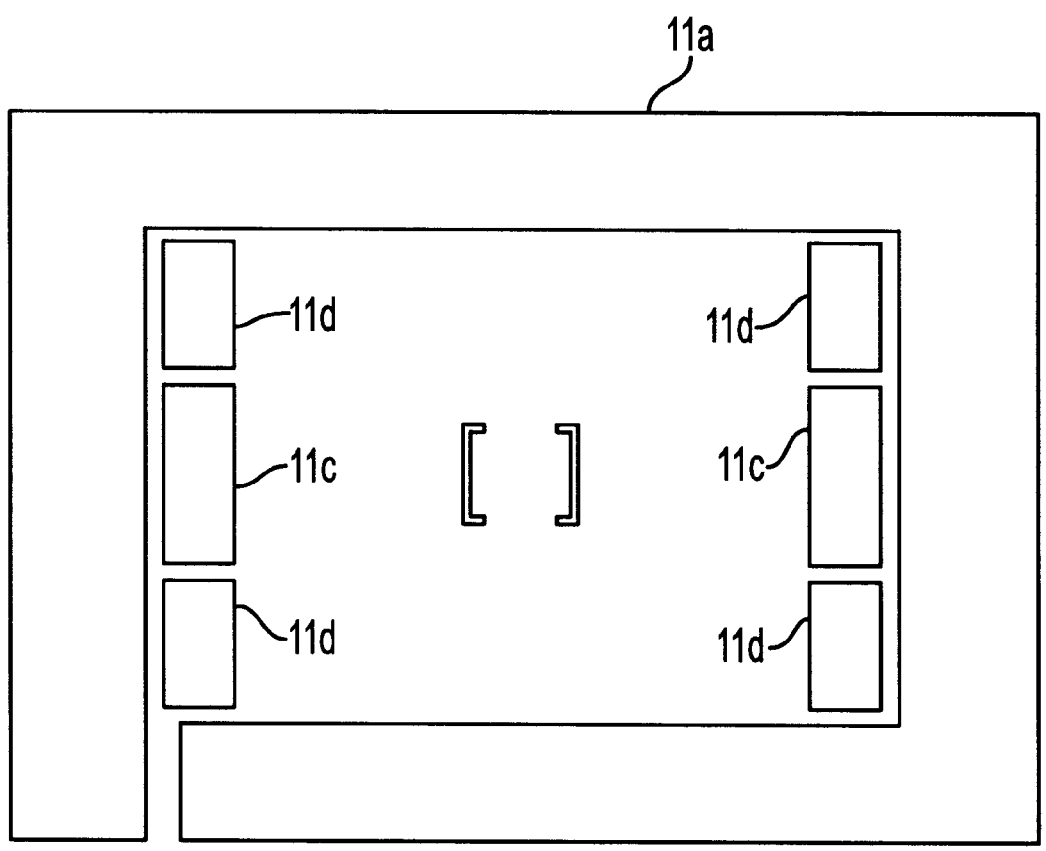
FIG. 6 shows the state in which another visual frame was formed in a diagram similar to FIG. 3.
Figure 7:
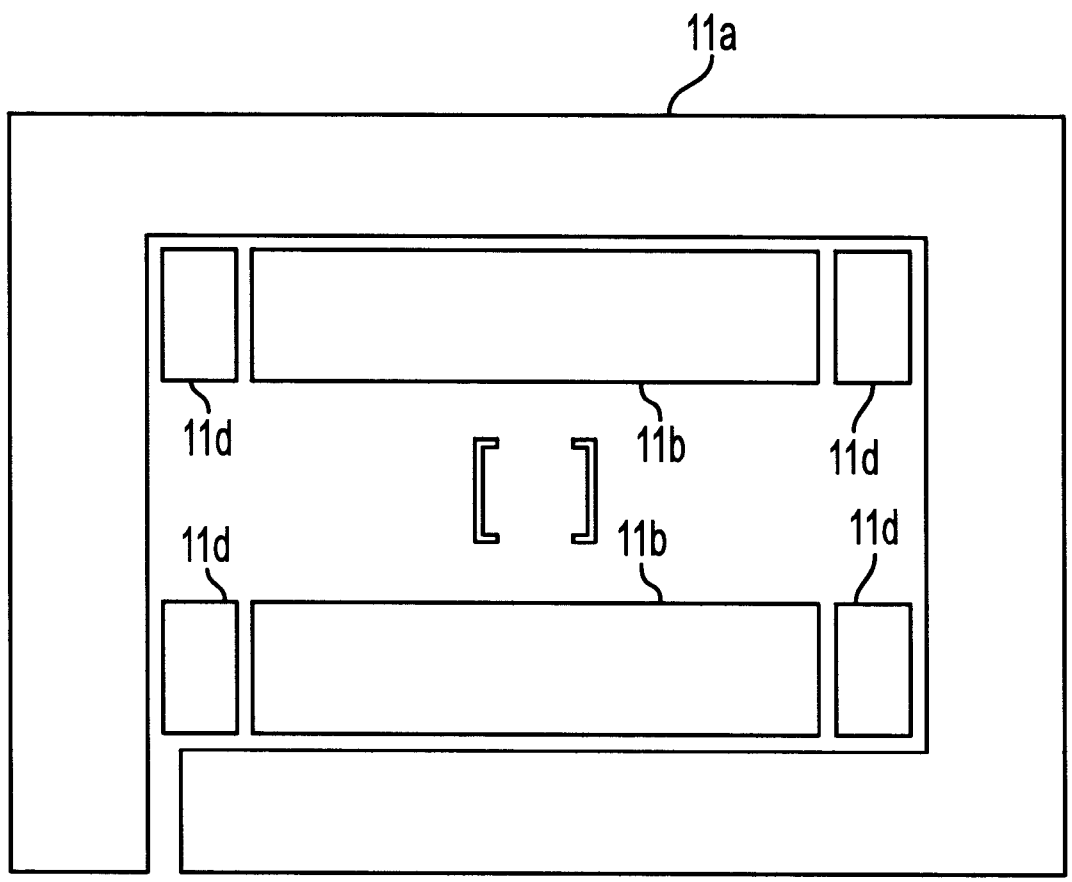
FIG. 7 shows the state in which yet another visual frame was formed in a diagram similar to FIG. 3.

Specific examples of the picture plane display are described with reference to FIGS. 5–7.

The CPU 61, placing the camera in a state in which photography is possible accompanying the main switch (not shown in the drawing) being set ON, during this, applies drive signals, via the liquid crystal drive circuit 62, to the elements 11b–11d which constitute the display element 11. Because by this means, the elements 11b–11d which have been disposed in the interior of the standard visual field, all become in the light transmitting state, the visual field becomes the standard visual field (FIG. 5) which was defined by the visual field frame member 4. When the LED 14 is extinguished, because the element 11a does not emit light, the visual field frame portion becomes in the blacked-out state.

In a case in which the subject is comparatively bright, the visual field extent can be clearly perceived in the blacked-out state, but when the subject is dark, the boundary of the visual field and visual field frame becomes indistinct, and the visual field cannot be correctly perceived. Consequently, on actuating the LED switch SW1, the LED 14 is lighted via the lighting circuit 62, its light is guided to the element 11a via the glass plates 12, 13, and the light scattered by the element 11a is guided toward the eyepiece. Accordingly, the portion of the element 11a disposed within the visual field frame (the portion connected to the visual field frame) is seen to shine brightly, and the visual field extent can be clearly perceived.

Figure 5:
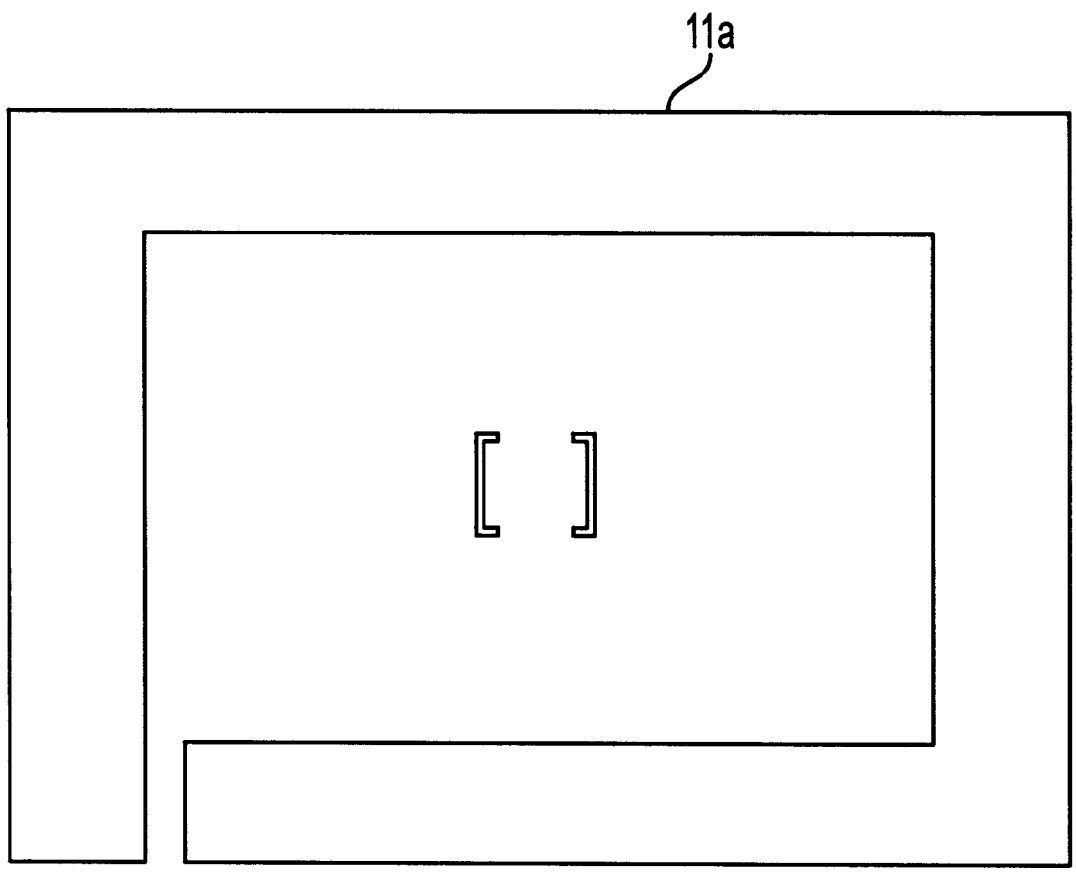
FIG. 5 shows the state in which a standard visual frame was formed in a diagram similar to FIG. 3.

In the state of FIG. 5, when the visual field changeover switch SW2 is set ON for 1 time, the CPU 61 interrupts the drive signal with respect to the elements 11c and 11d, while only the elements 11b remain in the driven state. By this means, the elements 11c, 11d become in the light obstructing state, and as shown in FIG. 6 the visual field is set with the right-hand and left-hand portions of the standard visual field obstructed. In this case also, when the LED is extinguished, the visual field frame, that is, the elements 11a, 11c, 11d are displayed in the blacked-out state; by causing lighting of the LED 14, because the elements 11a, 11c, 11d are seen to shine brightly, in the case when the subject is bright also, the visual field extent can be clearly perceived.

When the changeover switch SW2 is further set ON, the CPU 61 is in a state in which drive signals were applied only to the elements 11c. Because by this means the elements 11c become in a light transmitting state, as shown in FIG. 7 the visual field (panoramic visual field) is set with the upper and lower portions of the visual field obstructed. In this state also, similarly to that mentioned above, by means of the extinction/lighting of the LED 14, the visual field frame portion can be blacked out or caused to shine.

In the above embodiment, respectively, the element 11a constitutes the first display element; the elements 11b–11d, the second display elements; the LED 14, the irradiation means; and the liquid crystal drive circuit 62, the changeover means.

Second Embodiment

A second embodiment will be described with the aid of FIGS. 8 and 9. Furthermore, the same reference symbols are given to constitutional elements which are the same as in FIG. 3.

In this embodiment, it is such as to display a strobe mark in a portion of the visual field frame which forms the standard visual field. Namely, the clearance S which was formed by cutting out the left-hand lower portion of the outermost element 11a' is large in comparison with the first embodiment, and here a display element 11e is located which is of strobe mark shape. This element 11e, similarly to the elements 11a–11d, is also constituted by macromolecular dispersion type liquid crystal, and when in the light obstructing state, shines brightly due to the lighting of the LED 14. Then, for example during charging, by intermittently applying the drive signal to the element 11a, a flashing display by the strobe mark is caused, when charging is completed the drive signal is cut off and a lighted strobe mark is displayed. Moreover in the case of a mode which does not use a strobe, by means of applying a drive signal continuously, the strobe mark is made not to display. The wiring members in order to apply the drive signal to the elements 11b–11d may be passed through the clearance between the element 11a and the element 11e.

Figure 8:
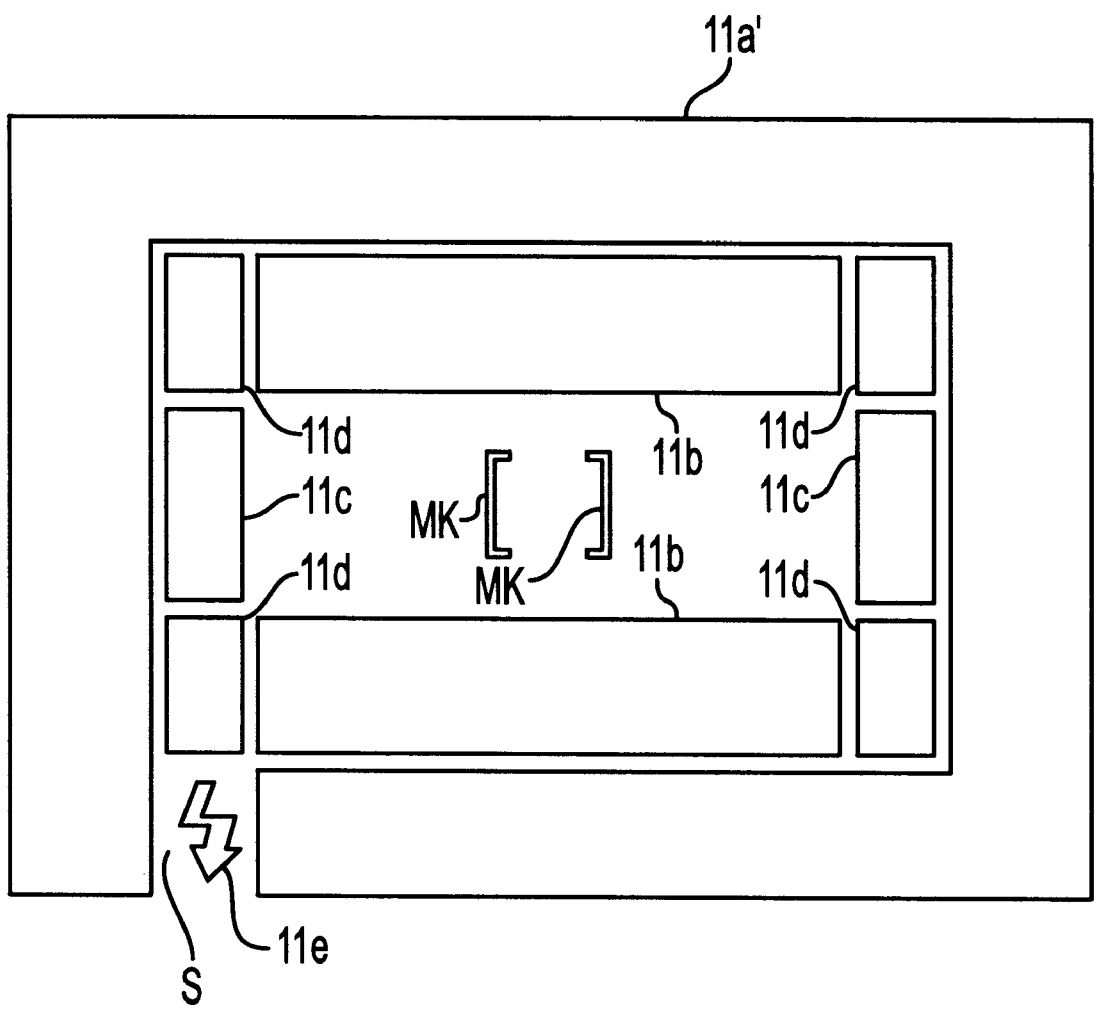
FIG. 8 is a diagram showing the viewfinder picture plane in a second embodiment.
Figure 9:
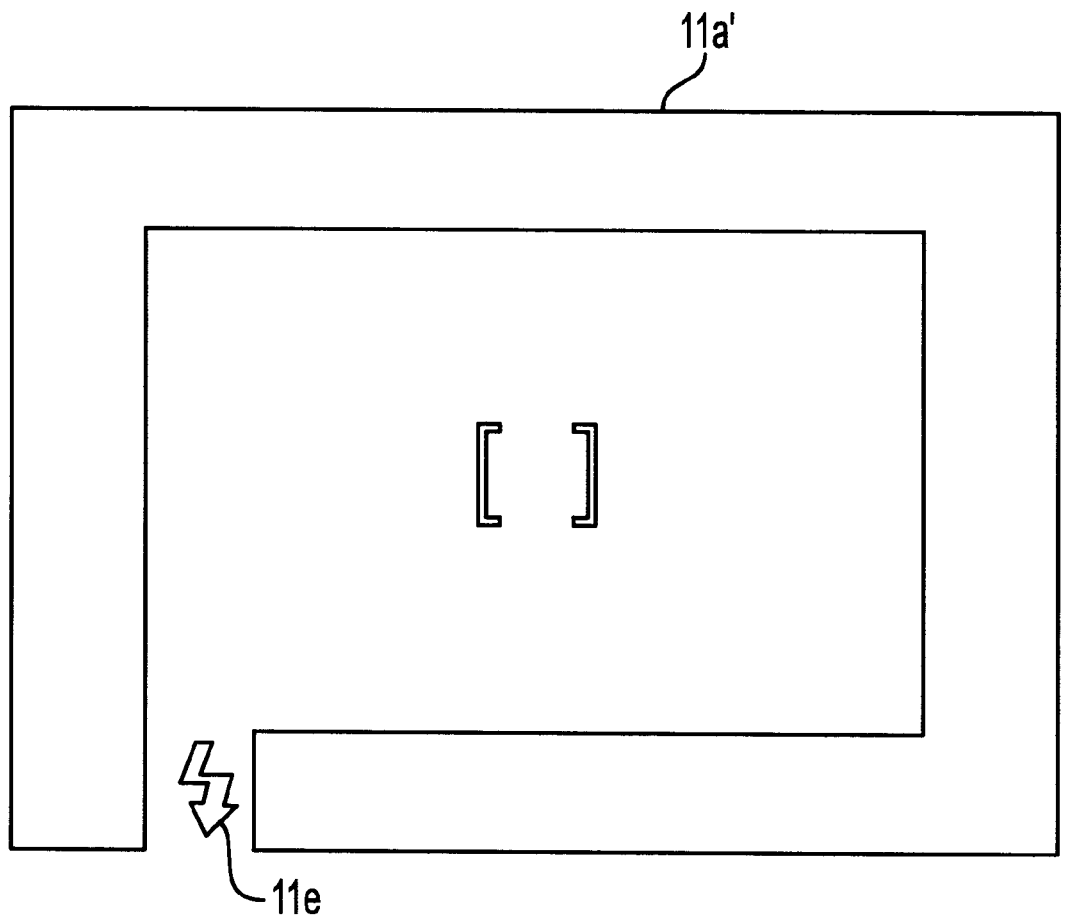
FIG. 9 shows the state in which a standard visual frame was formed in a diagram similar to FIG. 8.

FIG. 8 shows the state when the drive signal to all the elements is cut off; FIG. 9 shows the state (standard visual field display state) with drive signals applied to the elements 11b–11d.

By means of arranging a strobe mark in a portion of the outermost visual field frame (element 11a) such as in the present embodiment, even changing over in any picture plane, a mark is not displayed in the visual field, and the visibility of the visual field increases. Furthermore in comparison with the case of arranging elements for strobe mark use further outside the element 11a, the surface area of the visual field frame portion can be small.

Figure 10:
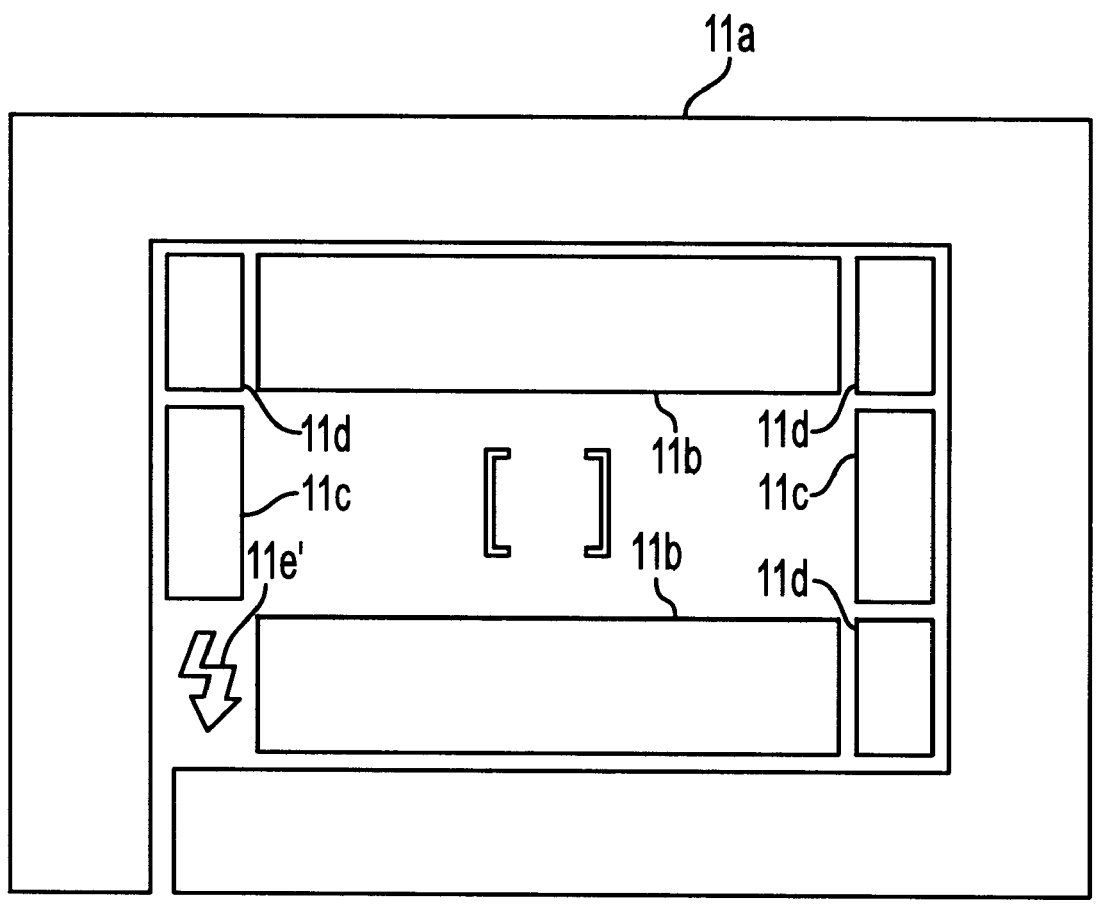
FIG. 10 is a diagram showing the viewfinder picture plane in another embodiment.
Figure 11:
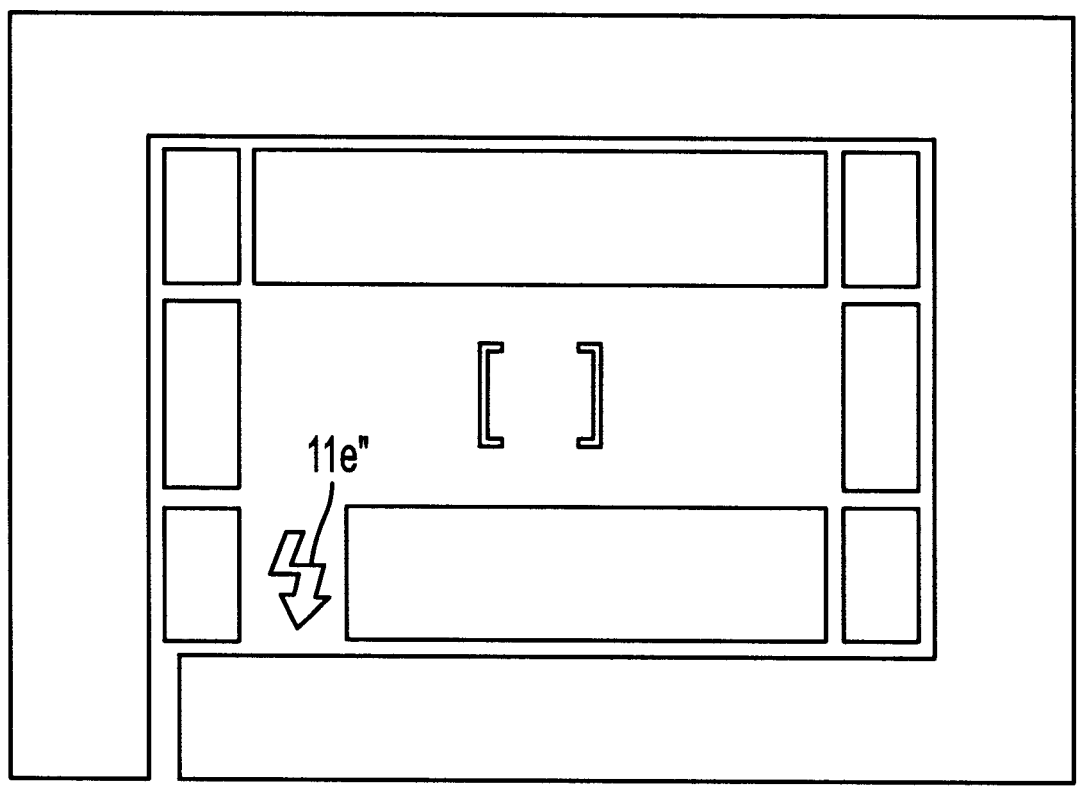
FIG. 11 is a diagram showing the viewfinder picture plane in another embodiment.

In FIG. 10, one of the four elements 11d has been replaced by a strobe mark display 11e'; in FIG. 11, a similar display element 11e" is arranged in a cut out portion of the elements 11b. In the example of FIG. 10, the strobe mark when there is a standard visual field is displayed within the visual field, but because displayed in positions adjacent to the visual field and in 2 kinds of visual fields other than this, visibility is good in comparison with a case displayed in a position separated from the visual field. In the case of FIG. 11, in the visual field outside the panorama, a strobe mark is displayed in the visual field, but is displayed outside the visual field at the panorama and also in a position adjacent to the visual field.

Third Embodiment

A third embodiment of the present invention will be described with the aid of FIGS. 12–15.

In this embodiment, there are disposed both the strobe mark display element 11e shown in FIG. 8, and the same display element 11e' shown in FIG. 10, and they are such as to display either of them according to the kind of visual field. Furthermore, the constitution of the control system is similar to that of the former embodiments.

Figure 12:
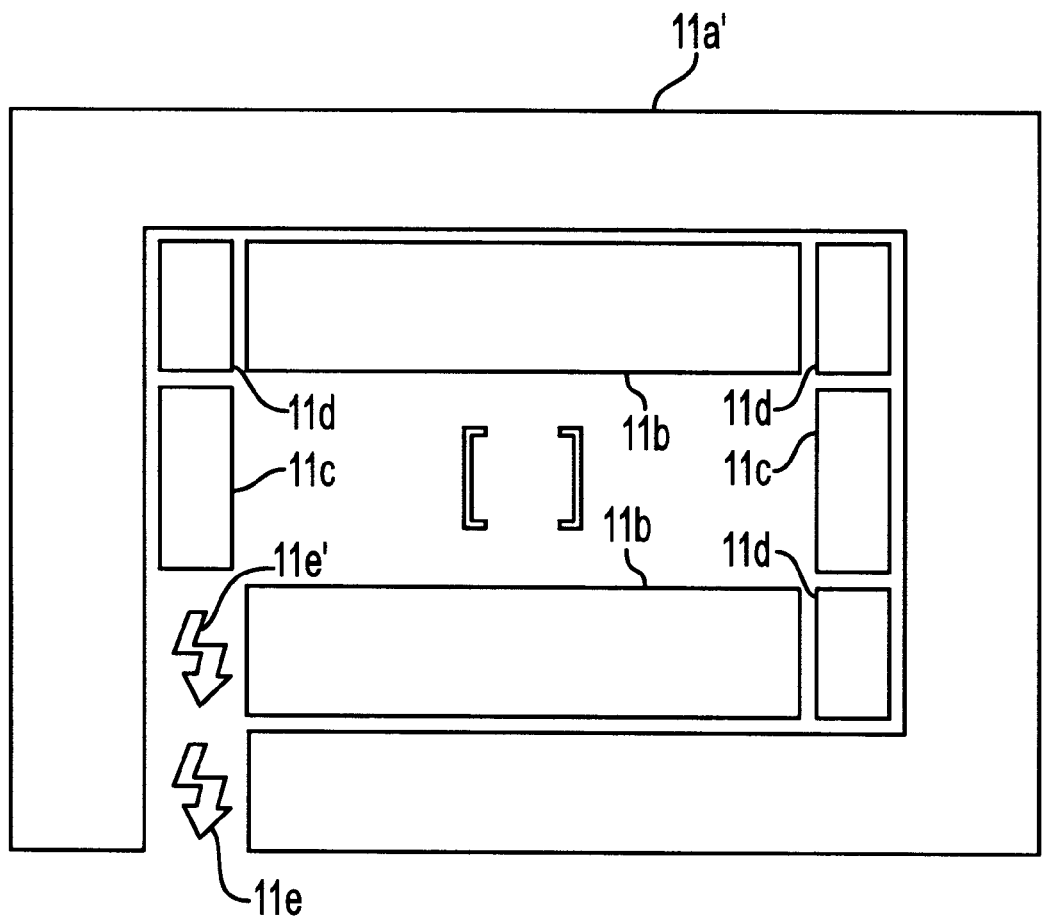
FIG. 12 is a diagram showing the viewfinder picture plane in a third embodiment.
Figure 13:
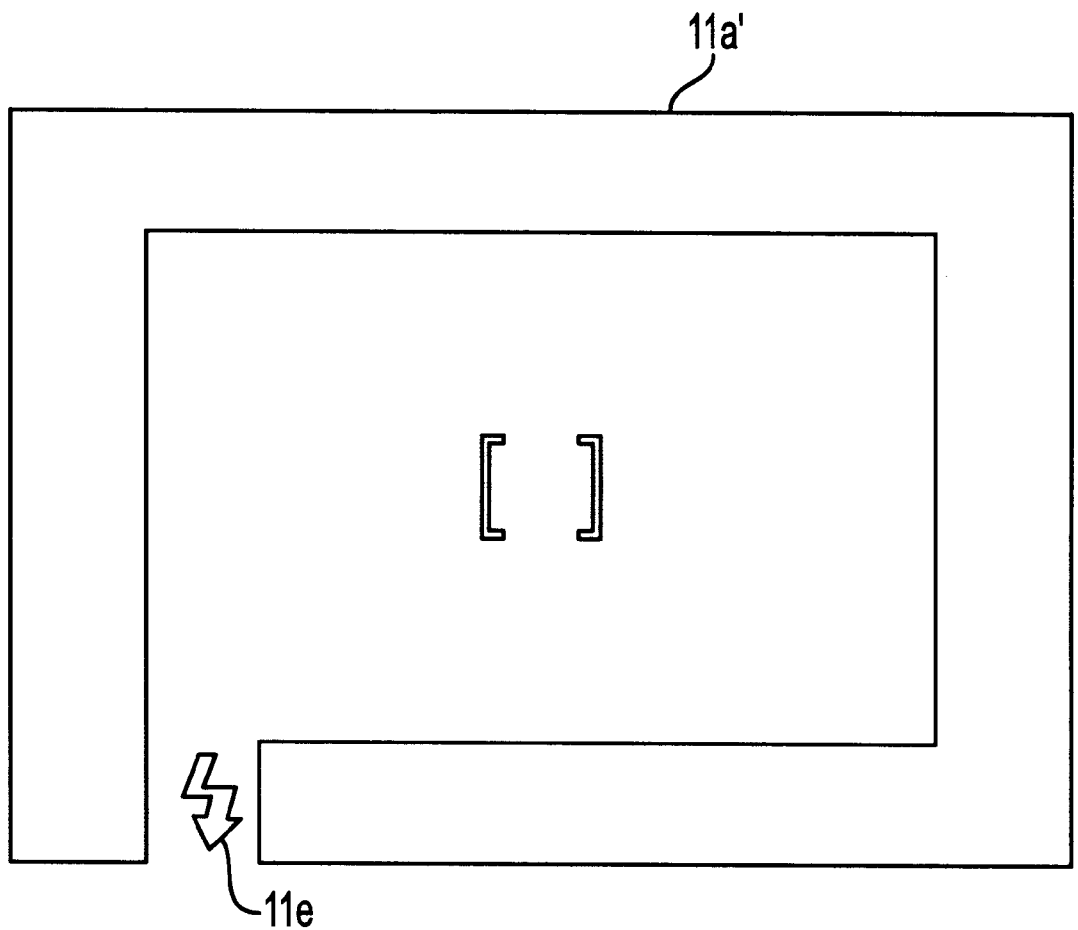
FIG. 13 shows the state in which a standard visual frame was formed in a diagram similar to FIG. 12.

FIG. 12 shows the state in which the drive signals to all the elements are interrupted; in this state, according to the setting of the standard visual field, the CPU 61 applies drive signals to the elements 11b–11d as mentioned hereinabove as the light transmitting state, and in addition applies a drive signal to the element 11e' as a light transmitting state. Then, in a case that a necessity arises to display a strobe mark, it displays (see FIG. 13) by means of interrupting the drive signal to the element 11e. Accordingly, the strobe mark is not displayed in the visual field, and the visibility of the visual field increases.

Figure 14:
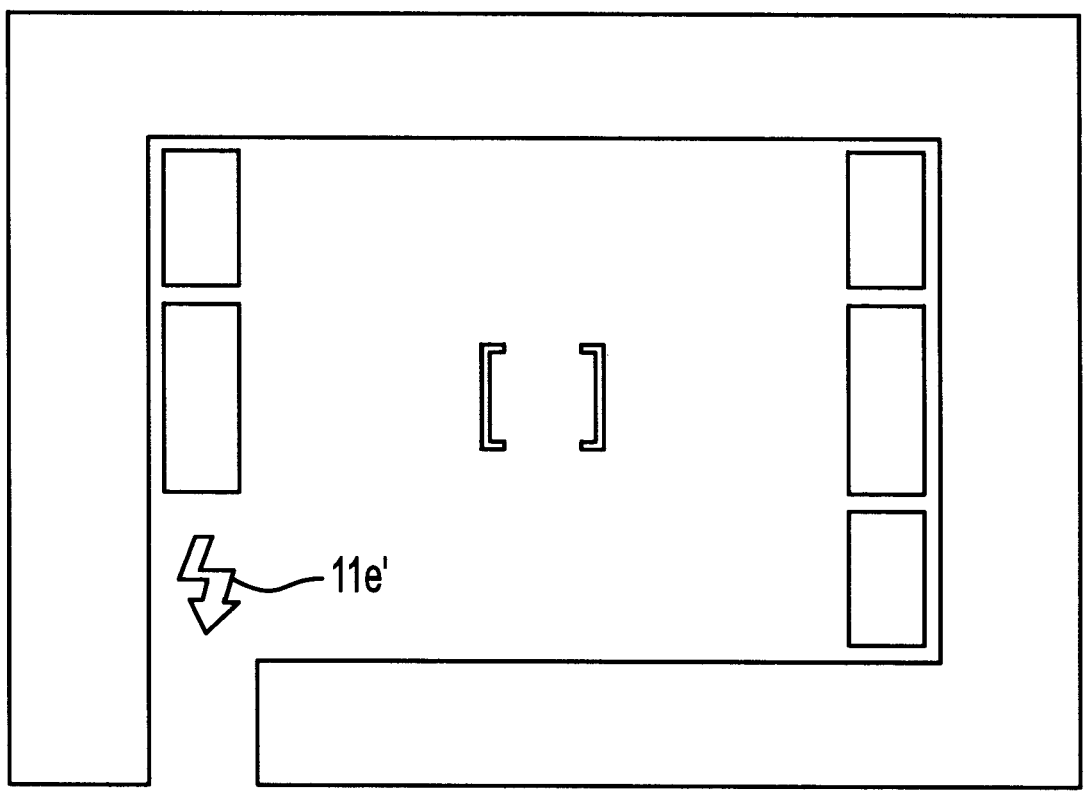
FIG. 14 shows the state in which another visual frame was formed in a diagram similar to FIG. 13.

In the case of forming a visual field, the left-hand and right-hand portions of the standard visual field having been cut off, a drive signal is applied to the element 11b only, as the light transmitting state, during this, a drive signal is applied to the element 11e also, as the light transmitting state. Then, in the case that the necessity arises to display a strobe mark, displays by cutting off the drive signal to the element 11e' (FIG. 14). Moreover, in a case of forming a visual field in which the upper and lower portions have been cut off from the standard visual field, a drive signal is applied to the element 11c only, as the light transmitting state, but in this case a drive signal is applied to the element 11c also, as the light transmitting state, and a strobe mark is displayed by means of the element 11e' (see FIG. 15).

Figure 15:
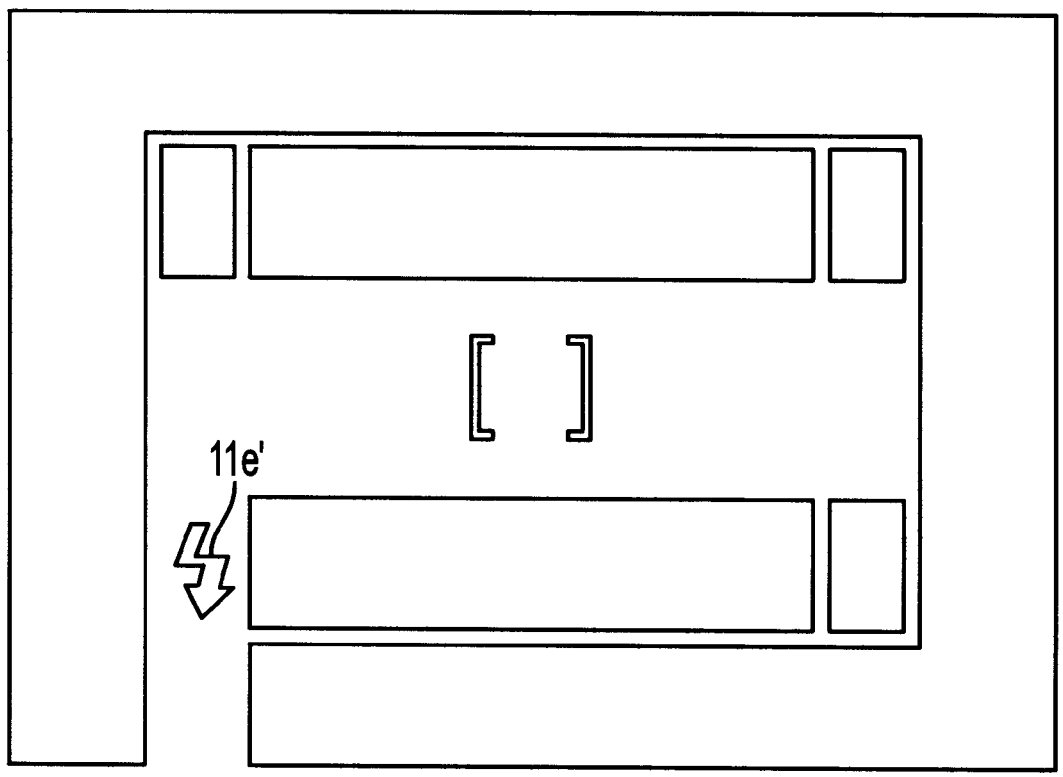
FIG. 15 shows the state in which yet another visual frame was formed in a diagram similar to FIG. 13.

Here, when a strobe mark is displayed by the element 11e, even if in the state in FIGS. 14 and 15, with the mark separated from the visual field, the visibility is not good. In this embodiment, because it performs display using the element 11e' in cases other than the standard visual field, normally the strobe mark is displayed in positions close to the visual field, and visibility is good. Moreover, in this case also, by means of extinguishing/lighting the LED 14 by actuating the lighting switch SW1, each element can be caused to be blacked-out or to shine brightly.

Furthermore, changing various elements in the strobe mark, for example, there are functions for displaying marks in order to inform of various modes of the camera. Moreover, in the abovementioned embodiment, one has been shown capable of displaying visual fields of 3 kinds in any picture plane, but may also be one capable of displaying only one kind of visual field. Furthermore, it was made such as to cause the element to shine by irradiating LED light on the macromolecular dispersion type liquid crystal element, but in particular, not having a LED kind of light source, may also be constituted to cause the element to shine by guiding other light to the element. Moreover, the present invention, other than the viewfinder device of a silver salt camera, can be applied to an electronic still camera or video camera, or also to the viewfinder devices of other optical instruments.

Figure 16:
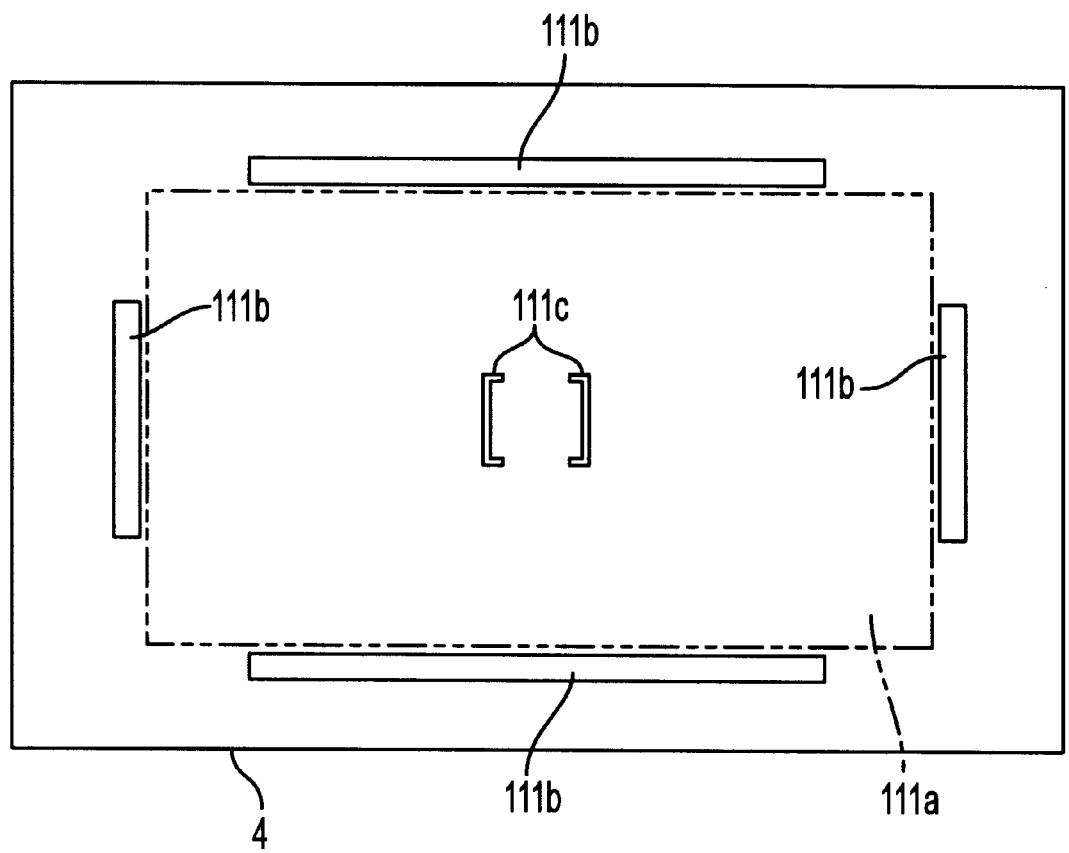
FIG. 16 is a diagram of the viewfinder picture plane seen from the eyepiece side.

FIG. 16 shows the viewfinder picture plane seen from the eyepiece side. The region surrounded by a double-dot chain line is the region the subject image is observed having transmitted through the aperture of the visual field frame plate 4, here corresponds to the visual field corresponding to the photographic extent. The display elements 111 are formed from an element 111a which is arranged such as to cover the whole visual field, and 4 elements 111b which display the visual field frame, and elements 111c for use in rangefinding area mark display of the center portion of the visual field. The elements 111b are extended along the 4 edges of the visual field, arranged adjacent to the boundary portions with the visual field within the visual field frame portion (the region light is obstructed by means of the visual field frame plate 4).

The element 111a maintains a light obstructing state when a drive signal is not applied, and becomes in the light transmitting state (transparent) when a drive signal is applied. Drive signals are not applied to the elements 111b, 111c, normally maintaining a light obstructing state. When the LED 14 lights, its light is guided to the elements 111a–111c via the glass plates 12, 13. Because the elements 111a–111c are all constituted by macromolecular dispersion type liquid crystal, when in the light obstructing state LED light is guided, they scatter this light and guide it toward the eyepiece, and because of this a portion of each element is seen to shine brightly.

Figure 17:
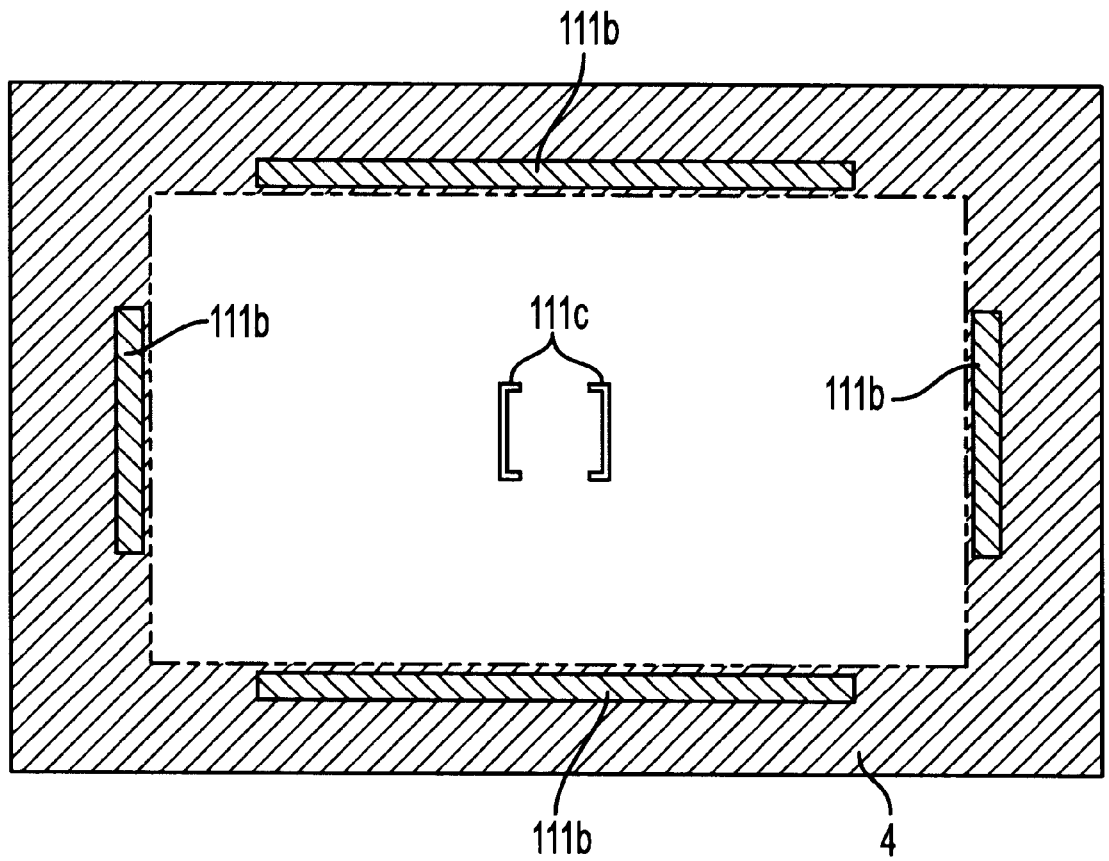
FIG. 17 is a diagram similar to FIG. 16, and shows the state when an LED is extinguished.
Figure 18:
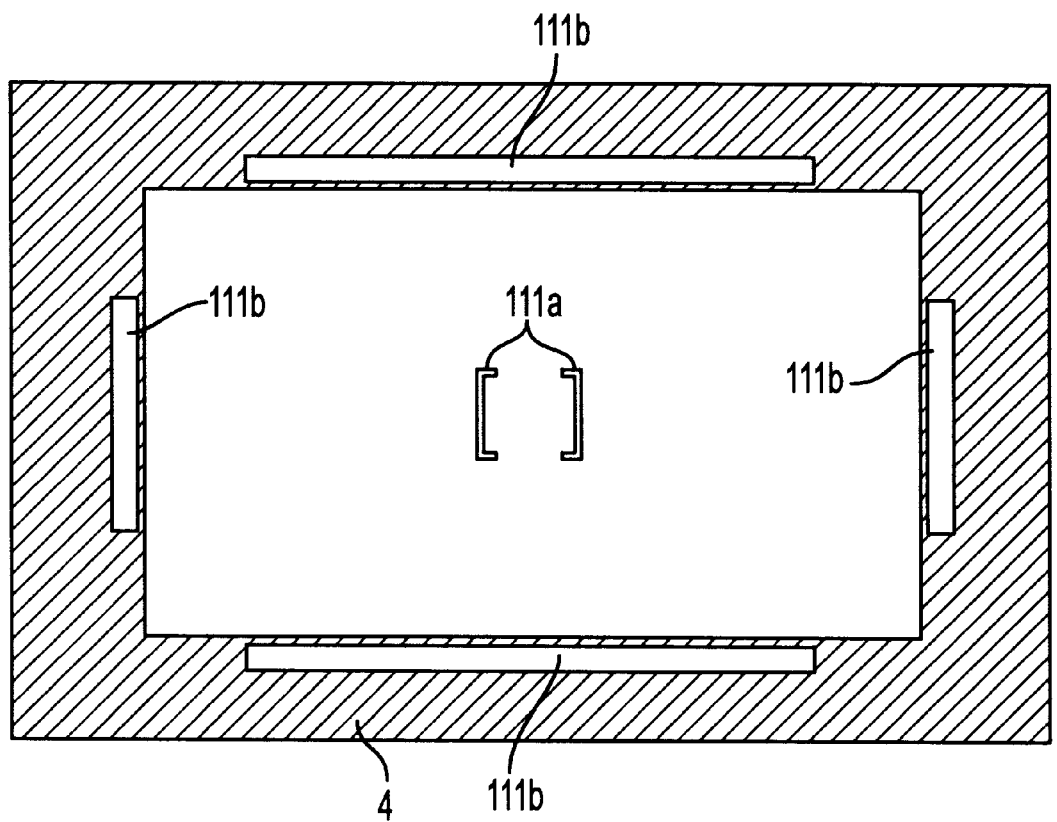
FIG. 18 is a diagram similar to FIG. 16, and shows the state when an LED is lighted.

Operation is described with reference to FIGS. 17 and 18. The CPU 61, in a state in which photography is possible accompanying the main switch (not shown in the drawing) being switched ON, during this, applies a drive signal to the element 111a constituting the display element 111 via the liquid crystal drive circuit 62. By this means, the element 111a becomes in a light transmitting state, and the subject image is reproduced in the visual field which has been defined by the visual field frame plate 4. FIG. 17 shows the state when the LED 14 is extinguished, at this time the visual field frame portion and the rangefinding area mark consist of the blacked-out state (the obliquely shaded portion).

In cases in which the photographic field is comparatively bright, the visual field extent can be accurately perceived in the blacked-out state, but in cases in which the photographic field is dark, the boundary of the visual field and the visual field frame becomes indistinct, and the visual field cannot be correctly perceived. Consequently, when the lighting switch SW1 is actuated, the LED 14 lights, its light is guided via the glass plates 12, 13 to the elements 111a–111c, and the light which was scattered by the elements 111b, 111c which are in a light obstructing state is guided toward the eyepiece. Accordingly the visual field extent can be clearly recognized, seeing (see FIG. 18) the element 111b portion disposed within the visual field frame portion (the directly outside portion of the visual field). Moreover, because the rangefinding area marks are also clearly seen, the rangefinding area can be clearly perceived.

However, arranging the abovementioned elements 111b in the whole visual field frame portion, in the case that the photographic field is dark, the whole visual field frame portion is considered to be brightly lit. However, in this case, the amount of light guided toward the eyepiece is not too much, the boundary of the visual field and visual field frame is all the more difficult to see. In this embodiment, because made such that only places shine which are close to the visual field not in the whole visual field frame, there is no discomfort in recognizing the visual field due to an excessive amount of light. Moreover the portions which shine are visual field frame portions, that is, because they are outside the visual field, there is no loss of visibility of the subject.

Figure 19:
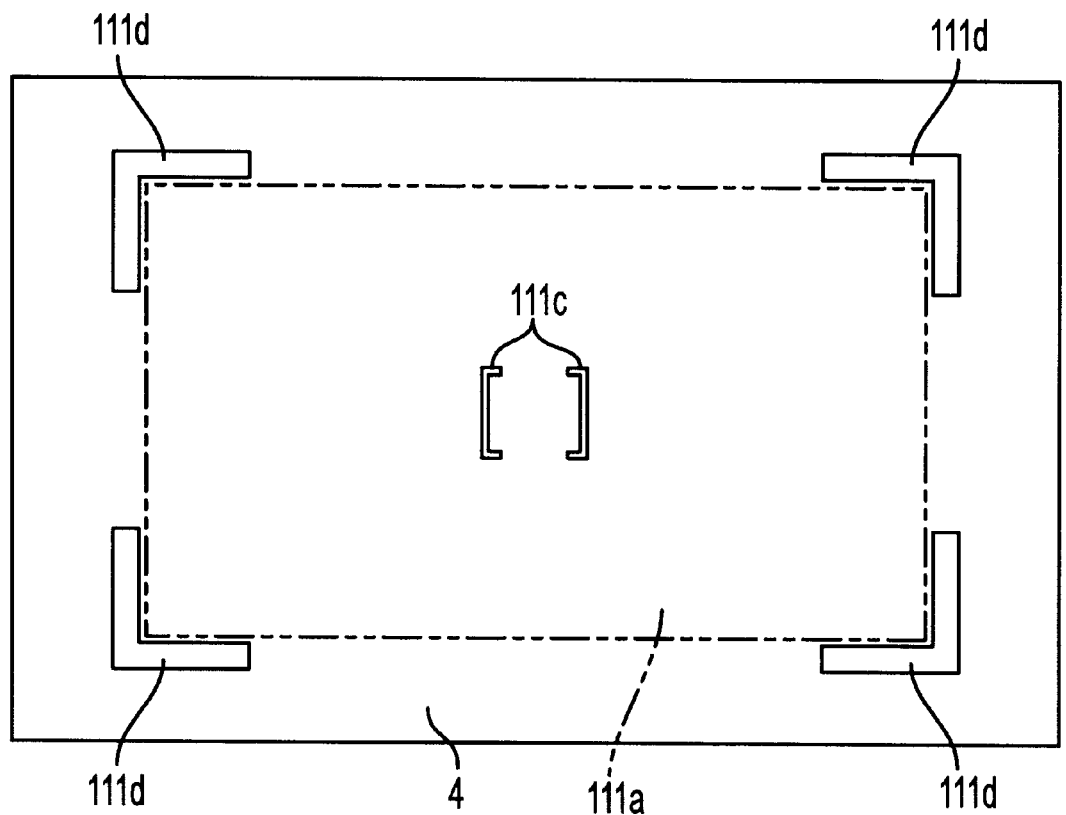
FIG. 19 is a diagram showing the viewfinder picture plane in another embodiment.
Figure 20:
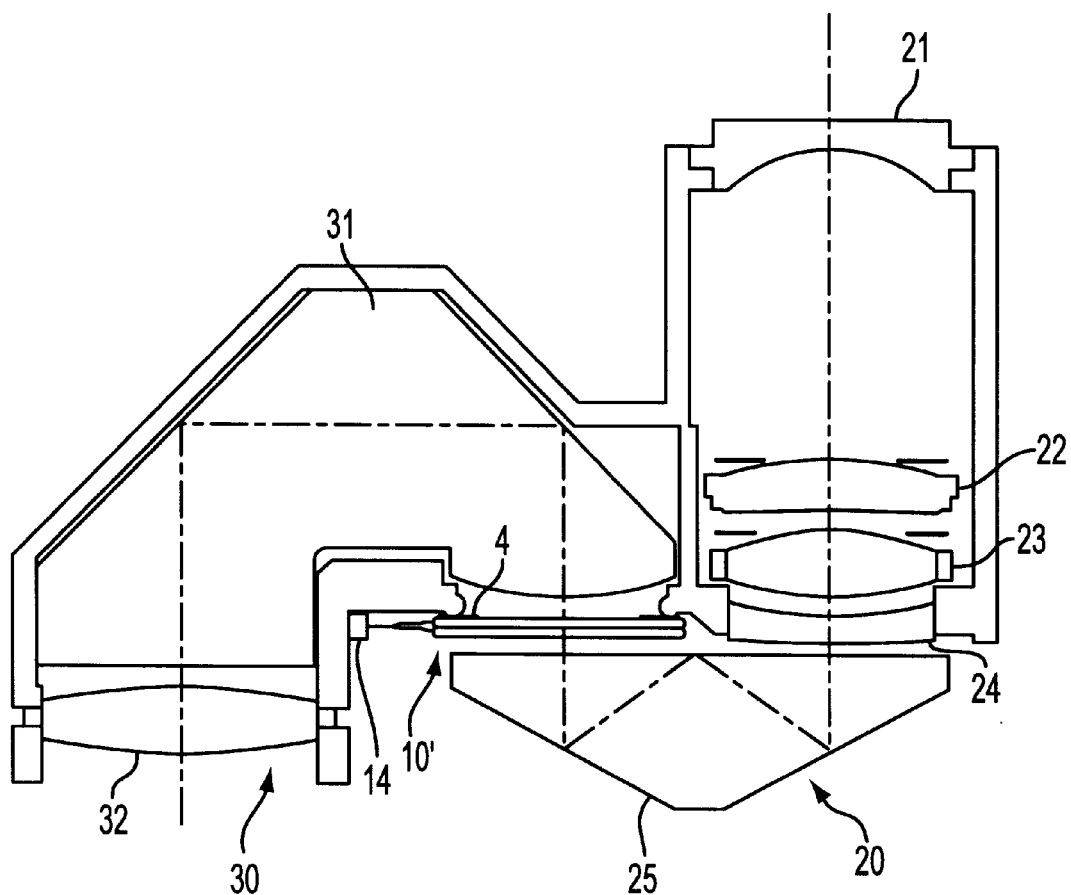
FIG. 20 is a cross sectional plan view showing a viewfinder device of a camera.

Moreover, the position of the display elements which form the visual field frame is not limited to FIG. 16, for example, as shown by reference symbol 111d in FIG. 19, may be disposed adjacent 4 corners of the visual field. In this case also, because the element 111d is outside the picture plane, visibility of the subject is not lost.

An embodiment of the present invention is described with the aid of FIGS. 20–24. Furthermore elements which are similar to those of FIGS. 1–15 are given the same reference symbols.

Figure 22:
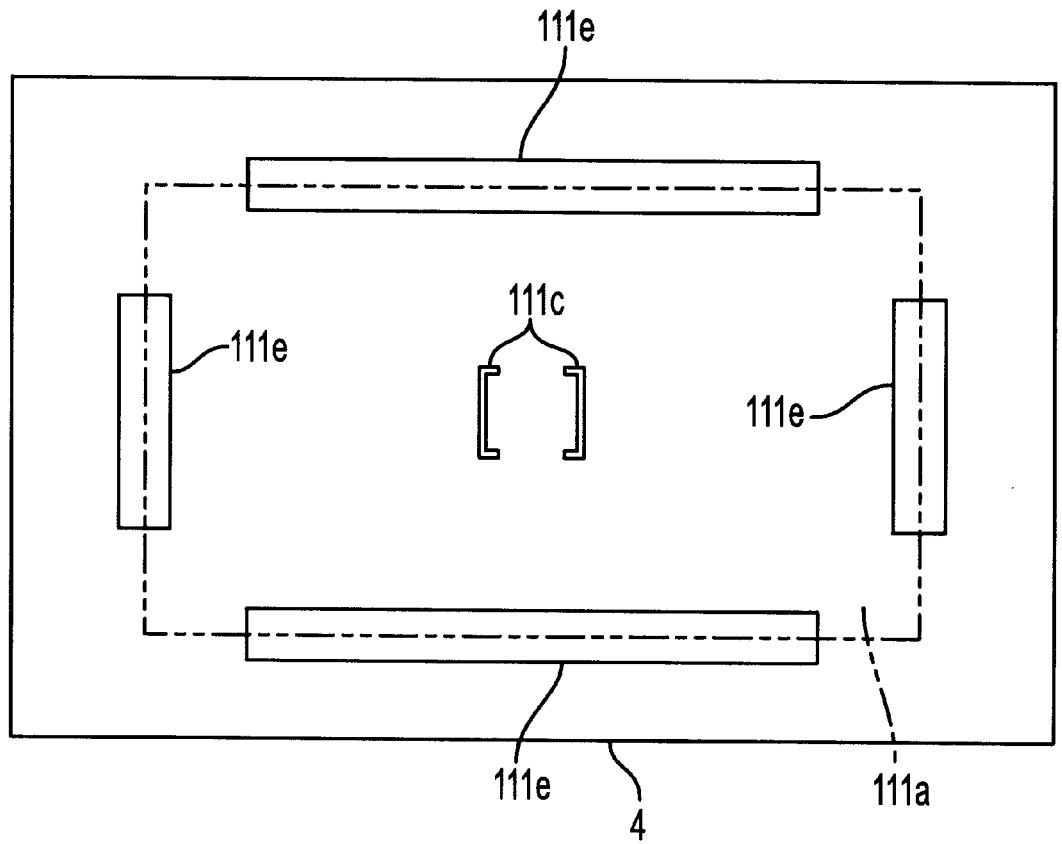
FIG. 22 is a diagram of the viewfinder picture plane seen from the eyepiece side.

The display unit 10' and display unit 11', disposed between the objective optical system 20 and the eyepiece optical system 30, differ only in arrangement from the configuration of the first embodiment. Namely, as shown in FIG. 22, the display element 11' consists of the element 111a arranged to cover the whole of the visual field, and the 4 elements 111e which form a visual field frame, and the elements 111c used to display the rangefinding area marks of the visual field center portion; these elements are constituted by macromolecular dispersion type liquid crystal.

Figure 21:
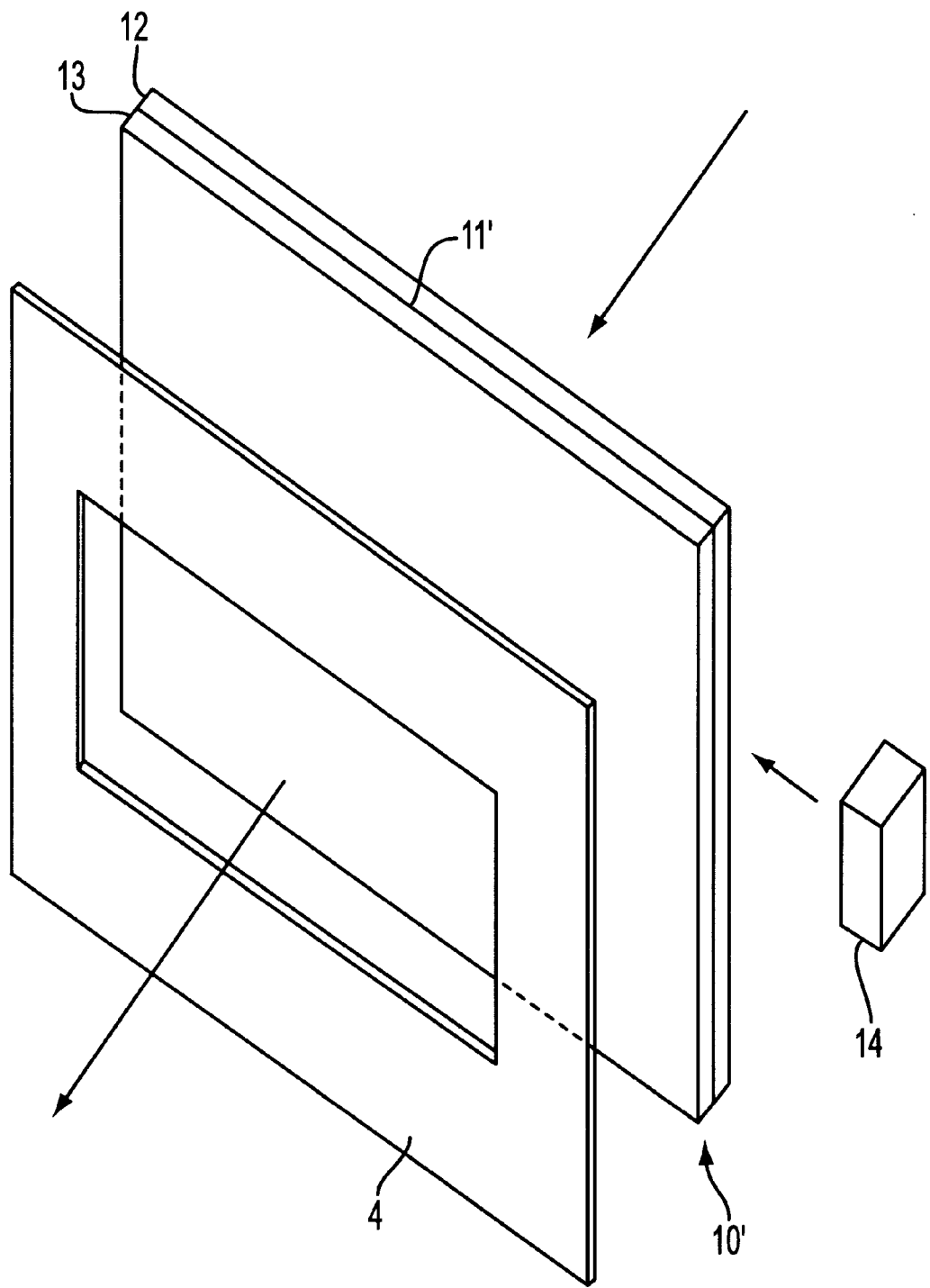
FIG. 21 is a perspective drawing showing the display unit and the visual field frame plate of the abovementioned viewfinder device.

Moreover as shown in FIG. 21, the light obstructing plate 4 is arranged on the eyepiece side (in detail, surface of the glass plate 13), not on the objective side of the display unit 10'. The element 111e, its one portion covers the visual field frame plate 4, the other portion is arranged such as to expose from the aperture of the visual field frame plate 4, and is extended respectively along 4 edges of the visual field. Furthermore, the constitution of the control system is similar to FIG. 4.

Figure 23:
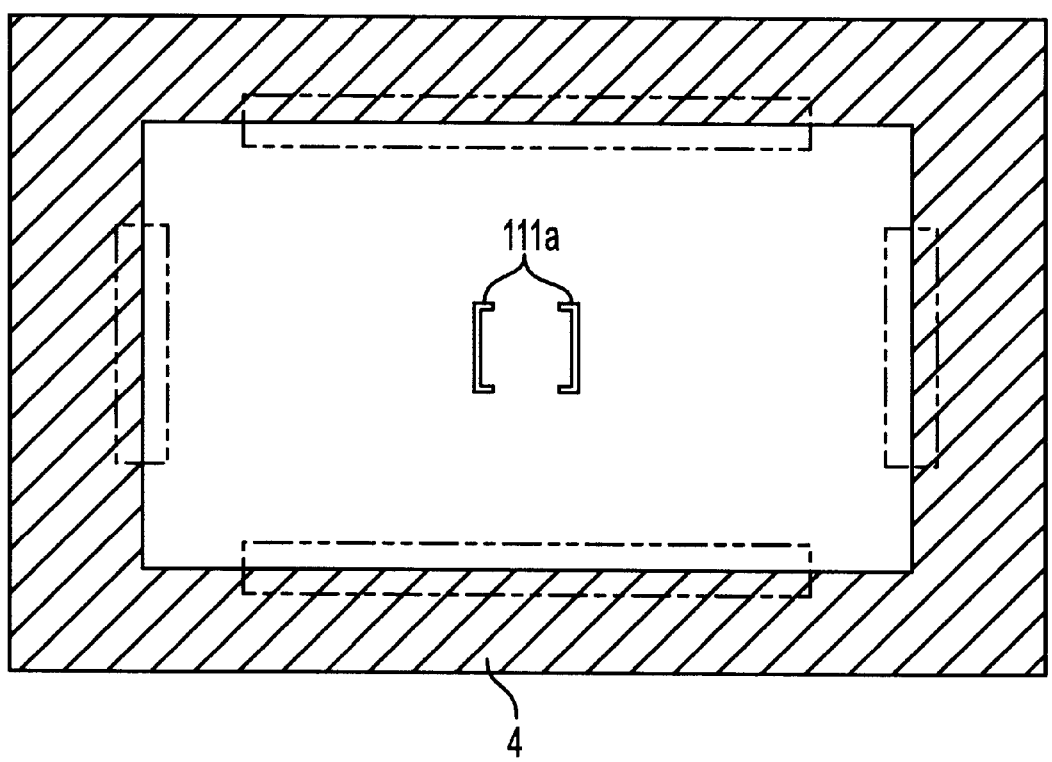
FIG. 23 is a diagram similar to FIG. 22, and shows the state when an LED is extinguished.
Figure 24:
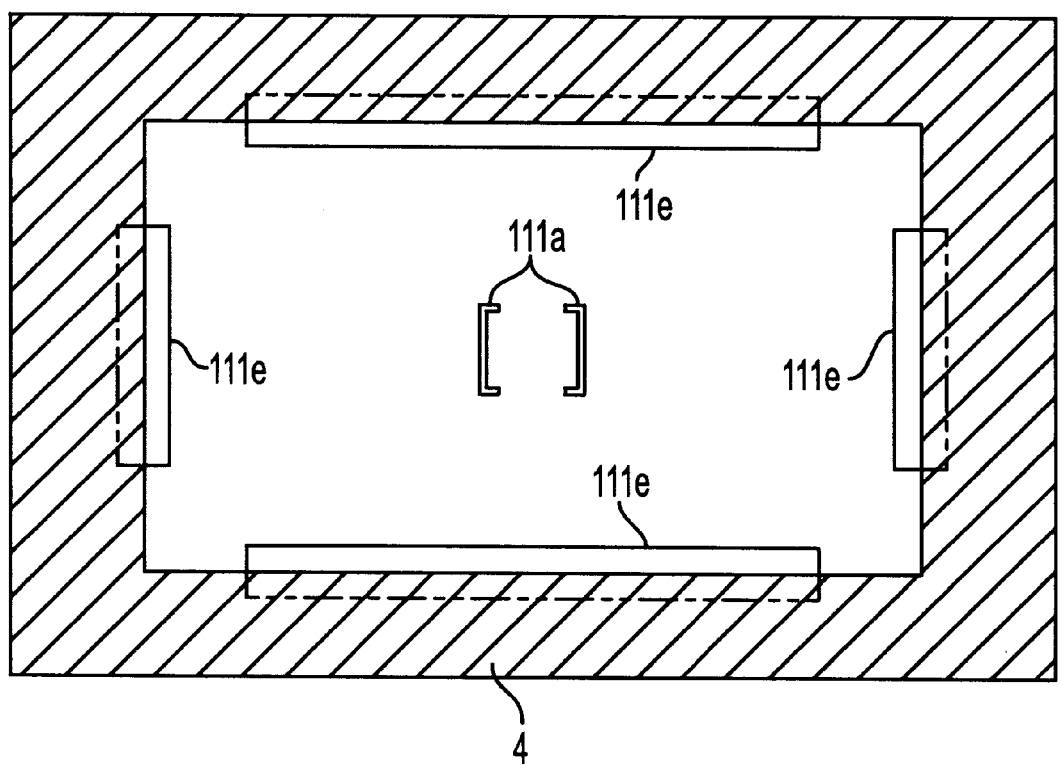
FIG. 24 is a diagram similar to FIG. 22, and shows the state when an LED is lighted.

Operation will be described with reference to FIGS. 23 and 24. The CPU 61, as a state in which photography is possible accompanying the main switch (not shown in the drawing) being set ON, during this, applies drive signals to the element 111a and elements 111e which constitute the display element 11', via the liquid crystal drive circuit 62. By this means the element 111a becomes in the light transmitting state, and the subject image is reproduced in the visual field (corresponding to the photographic extent) defined by the visual field frame plate 4. Moreover because the elements 111e also become in the light transmitting state, the subject image in the visual field is not concealed by the elements 111e. FIG. 23 shows the state when the LED 14 is extinguished, at this time the visual field frame portion and the rangefinder area become in the blacked-out state (the oblique shading portion).

When the photographic field is dark, when the lighting switch SW1 is actuated, the CPU 61 lights the LED 14 and in addition, interrupting the drive signals to the elements 111e, these become in the light transmitting state. Due to this, the elements 111e scatter the LED light and shine, but the scattered light of the portion which was covered by the light obstructing plate 4 is obstructed by the light obstructing plate 4, and only the scattered light of the portion which exposes the visual field is observed on the eyepiece side (FIG. 24). Accordingly the photographer can recognize that the outside end portion of the portion which appears to shine is the boundary of the visual field and the visual field frame. Moreover, in this case also, because the region which shines is comparatively small, the visual field can be perceived without discomfort due to an excessive amount of light.

However, in the case of arranging the element 111b (FIG. 16) for visual field frame use such as the abovementioned embodiment in the visual field frame portion (outside of the visual field), by causing the visual field defined by the aperture of the visual field frame plate 4, and the region delimited by means of the 4 elements 111b, to completely coincide, it is necessary to cause the inside end portions of the elements 111b to coincide with the aperture end portions of the visual field frame plate 4. However, for this it is necessary to maintain a highly accurate position setting, in actuality the region defined by the elements 111b according to FIG. 16 becomes slightly larger than the visual field defined by the aperture. In this embodiment, arranging the 4 elements 111b more toward the eyepiece, because the elements 111b are arranged so as to overlap the aperture end portions of the visual field frame plate 4, seen from the eyepiece side when the LED is lighted, the outside end portion of the shining portion and the aperture end portion (boundary of the visual field and visual field frame) completely coincide, and the visual field, namely, the photographic extent, can be correctly perceived, whether the LED 14 is lighted or extinguished.

Figure 25:
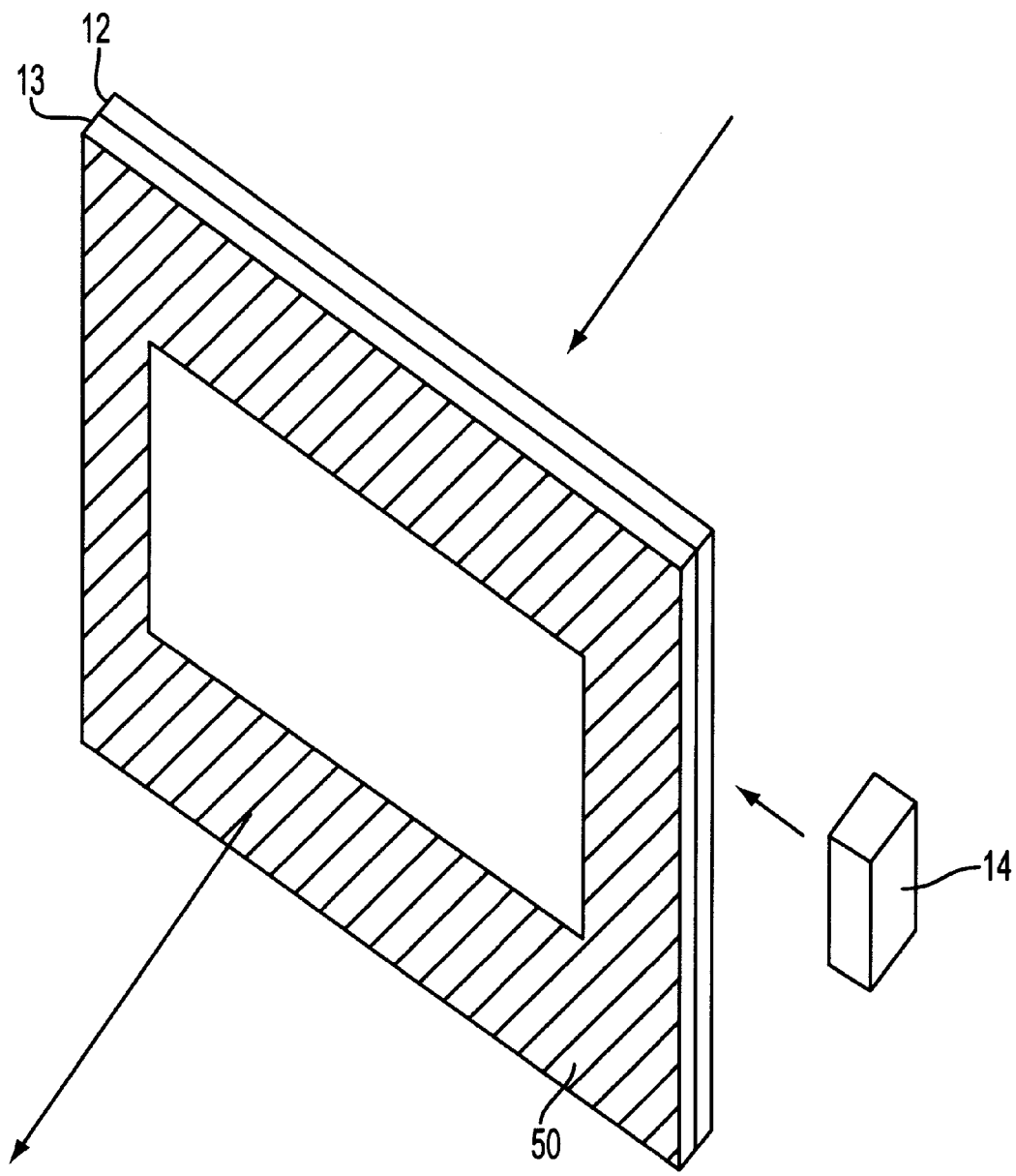
FIG. 25 is a diagram showing a modified example of a visual field frame member.

FIG. 25 shows an example in which the visual field frame plate is replaced by chromium oxide 50 which is a light obstructing material and is vaporized on the surface (portion except for the central aperture) of the glass plate 13. By this means, the number of components is decreased compared with the case of a separately arranged visual field frame plate, an improvement in ease of assembly is conferred, and in addition, the positional variability with the liquid crystal display members can be reduced.

Figure 26:
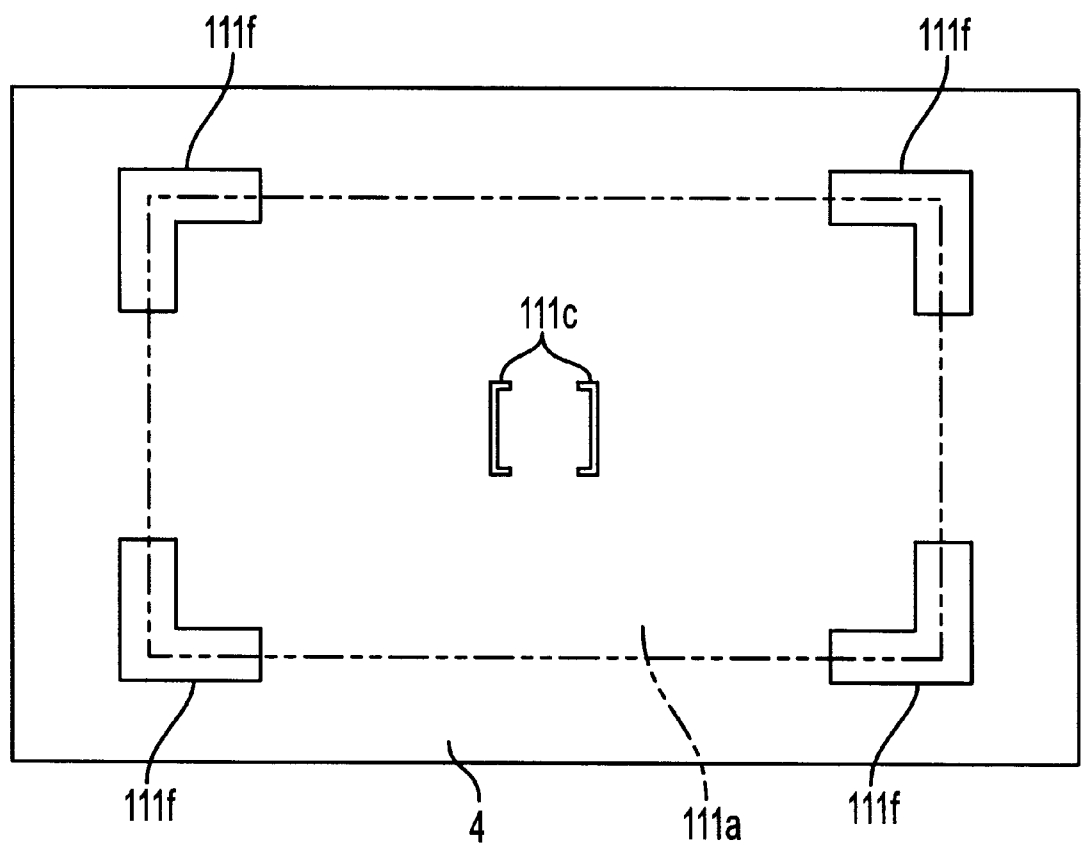
FIG. 26 is a diagram showing the viewfinder picture plane in another embodiment.

Moreover as shown in FIG. 26, the display elements 111 which form the visual field frame may be disposed at the 4 corners of the visual field. In this case also, by means of covering a portion of the elements 111f by means of the visual field frame plate 4, the outside end portion of the shining portion coincides completely with the boundary of the visual field and the visual field frame, and the photographic extent can be correctly perceived.

Figure 27:
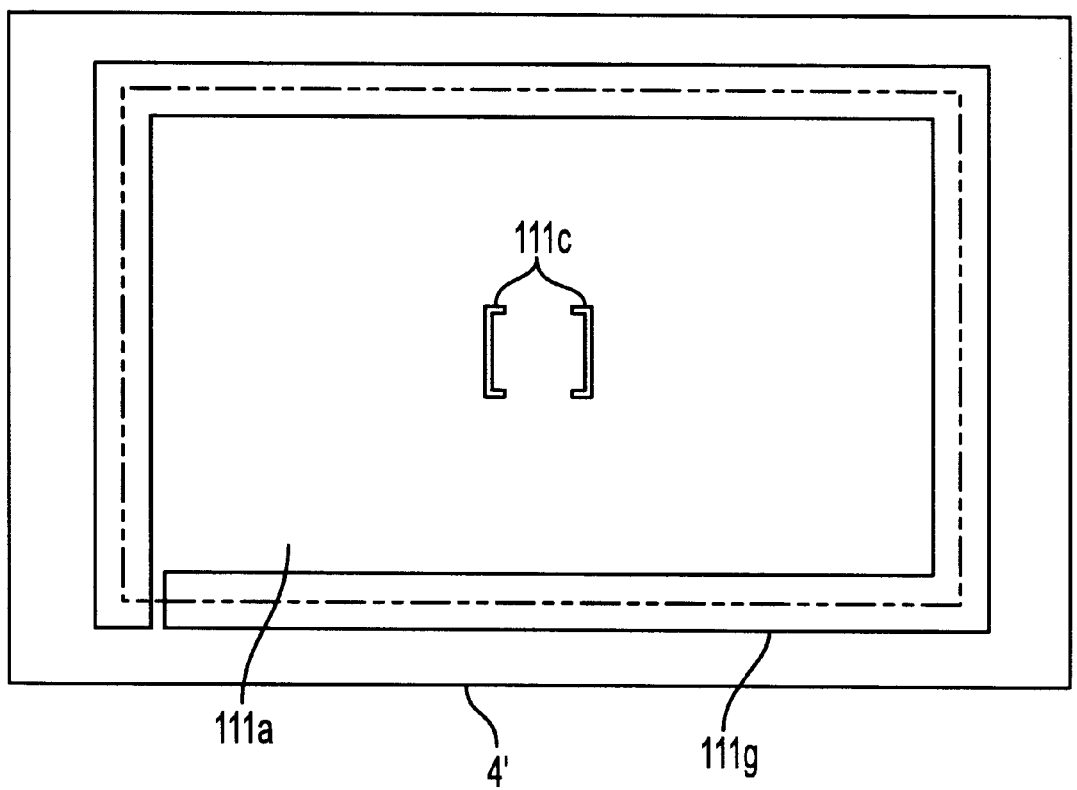
FIG. 27 is a diagram showing the viewfinder picture plane in yet another embodiment.
Figure 28:
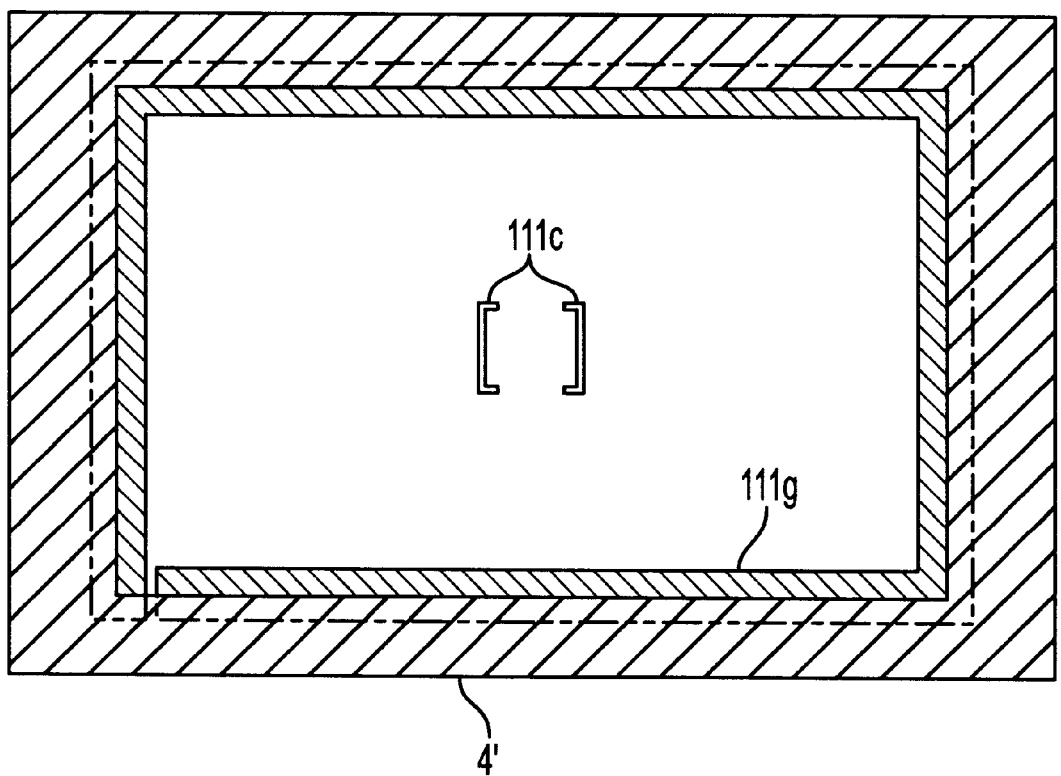
FIG. 28 is a diagram similar to FIG. 27, and shows the state when an LED is extinguished.
Figure 29:
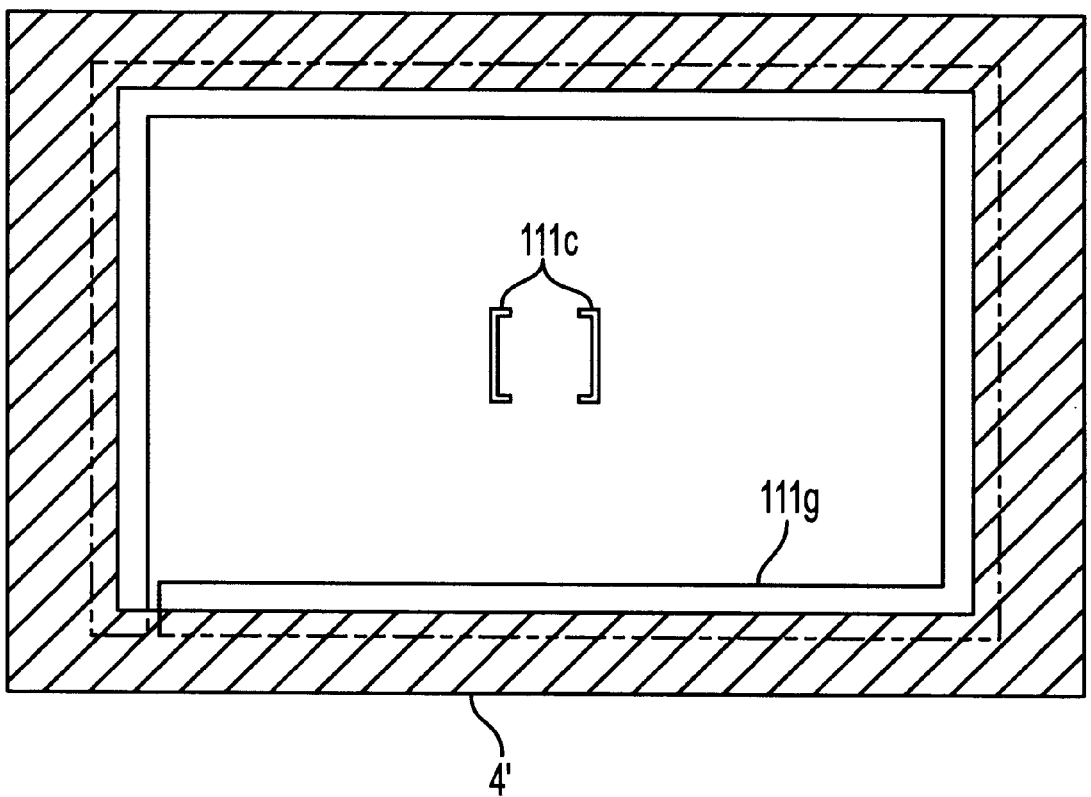
FIG. 29 is a diagram similar to FIG. 27, and shows the state when an LED is lighted.

FIGS. 27–29 show another embodiment.

In the abovementioned embodiments, the aperture of the visual field frame plate 4 corresponded to the photographic extent, but in the present embodiment, the aperture of the visual field frame plate 4 corresponds to an extent wider than the photographic extent. The element 111g (consisting of macromolecular dispersion type liquid crystal) for visual field frame display use is arranged across about the whole of the aperture peripheral edge portion of the visual field frame plate 4', and when seen from the eyepiece side the outside portion of the element 111g is covered by the visual field frame plate 4'. Then, the region delimited by this element 11g corresponds to the visual field, that is, the photographic extent. Furthermore, a clearance which was disposed at the left-hand lower portion of the element 111g is in order for wiring to pass through for use in applying drive signals to the element 111a which was arranged in the whole photographic region.

When the main switch is set ON, the CPU 61 (FIG. 4) applies drive signals to the element 111a and puts this in the light transmitting state. When the LED 14 is extinguished with a bright photographic field, as shown in FIG. 28 the portion at which light is obstructed by the visual field frame plate 4' and the portions of the elements 111g, 111c become in a blacked out state, the visual field (photographic extent) which is the inside region of the element 111g can be accurately perceived. In the case that the photographic field is dark, when the LED 14 is lighted, the elements 111g, 111c shine brightly, only the light of their inside portion (the portion not covered by the visual field frame plate 4') is guided toward the eyepiece (see FIG. 29). In this case also, can perceive that the inside region of the shining portion 111g is the photographic extent.

By means of an embodiment such as this, because the inside region of the element 111 similarly consists of the photographic extent, in the case whether the visual field frame portion is in the blacked-out state or shining, the photographic region is not erroneously perceived. Moreover because it is not necessary to put the element 111g in the light transmitting state, wiring and an electrode to apply a drive signal to the element 111g are unnecessary.

Furthermore hereinabove the extinguishing/lighting of the LED 14 was performed by the actuation of the lighting switch SW1, but lighting of the LED 14 may be controlled according to the subject luminosity, which is the output from a photometric element 63. Namely, it may be that if the subject luminosity is above a predetermined value, the LED 14 is extinguished, if it falls below the predetermined value the LED is lighted. Moreover, extinguishing/lighting the LED effected the black-out or shining of the elements, but instead of disposing an LED or the like light source, the constitution may be such that external light is guided to the elements and causes them to shine.

By means of the first invention, because it was made such that light was irradiated into a light obstruction type of visual field frame display element and this scattered light was guided toward the eyepiece, the visual field frame portion can be caused to shine or be blacked out, according to the luminosity of the subject field, normally it becomes possible to accurately perceive the visual field range.

By means of the second invention, a second display element (which forms a second visual field) is disposed in a first visual field defined by means of a first display element, it is possible to change over a second visual field frame between a light transmitting state and a light obstructing state, because it was made such that, irradiating light to the two display elements, guides this scattered light toward the eyepiece, plural kinds of visual field can be set, for each visual field frame its visual field frame portion can be blacked out or caused to shine, normally it is possible to accurately perceive the visual field range.

If a third display element is arranged in a clearance formed by cutting out a portion of the first display element, not disposing a display element outside of the first display element, moreover without causing the perceivability of the visual field to become poor, another display is performed by means of a third display element which does not cause worsening of the perceivability of the visual field. If wiring is passed through in order to apply a drive signal to a second display element between the third display element and the first display element, it is not necessary to unnecessarily allocate elements in order to dispose a clearance for wiring use.

By means of the third invention, there are disposed a first warning display element arranged in a clearance which has been cut out from a portion of the first display element, and a second warning display element arranged in a clearance which has been cut out from a portion of the second display element, because such as to use the first warning display element in a case which performs a warning when the second visual field frame display element is in the light transmitting state, and to use the second warning display element in a case which performs a warning when the second visual field frame display element is in the light obstructing state, normally a warning display can be performed in a position outside the visual field and also close to the visual field, and an increase of the visibility of both the visual field and the warning display is provided for.

By means of the fourth invention, arranging a display element for visual field frame use in the neighborhood of the boundary portion with the visual field within a region where light is obstructed by means of a visual field frame member, because it was made such that the display element was caused to shine by means of light guiding means, in a case in which the subject field is bright the visual field extent can be accurately perceived by means of the visual field frame member, in a case in which the subject field is dark the visual field extent can be accurately perceived by means of causing the display to shine. Moreover, because the portion which shines is only close to the boundary of the visual field and the visual field frame, the visual field is accurately perceived without discomfort due to an excessive amount of light.

By means of the fifth invention, a portion of the display element when seen from the eyepiece side is covered by means of the visual field frame member, and another portion is such as to expose from the aperture of the visual field frame member, because it is made such that the display element is caused to shine by mens of light guiding means, effects similar to the abovementioned are obtained, and in addition, the visual field extent defined by means of the visual field frame member and the visual field extent defined by means of the display element can be caused to coincide. For example, in a case in which the aperture of the visual field frame member corresponds to the photographic extent, the outside end portion of the display element (portion which shines) consists of the boundary of the photographic extent and the visual field frame. Moreover, in a case in which the aperture of the visual field frame member corresponds to an extent wider than the photographic extent, the inside end portion of the display element can be made to be the boundary of the photographic extent and the visual field frame.

The present invention is not limited to the embodiments hereinabove, and includes in its scope various constitutions which do not depart from the concept of the present invention.

Including the specification, scope of patent claims, drawings and abstract, the disclosure content of all of Japanese Patent Applications No. 10-53846 and No. 10-53847, dated Mar. 5, 1998, are incorporated herein by reference.

What is claimed is:

1. A viewfinder device having an eyepiece, comprising:
   a display element to display a visual field frame in a picture plane, the display element defining the visual field frame by obstructing a subject light beam;
   an irradiation device to irradiate light to the display element,
   wherein the display element comprises a light scattering material and light from the irradiation device scatters in the display element, and is guided toward the eyepiece.

2. A viewfinder device according to claim 1, further comprising a switching device to change the irradiation device between an operative state and a non-operative state.

3. A viewfinder device as recited in claim 1, wherein the display element comprises a macromolecular dispersion type liquid crystal.

4. A viewfinder device as recited in claim 1, further comprising a second display element comprising the same material as the display element, arranged in a clearance formed by a cut out portion of the display element.

5. A viewfinder device having an eyepiece, comprising:
   a first display element comprising a material that scatters light, and which displays a first visual field frame in a picture plane by obstructing a subject light beam;
   a second display element, comprising a material having a light transmitting state and a light obstructing state and which scatters light when in the light obstructing state, to display a second visual field frame within a visual field defined by the first visual field frame by obstructing the subject light beam;
   a changeover device to change the second display element to either the light transmitting state or the light obstructing state;
   an irradiating device to irradiate light to the first and second display elements,
   wherein the light from the irradiation device is scattered in the first and second display elements, and is guided toward the eyepiece.

6. A viewfinder device as recited in claim 5, further comprising a switching device to change the irradiation device between an operative state and a non-operative state.

7. A viewfinder device as recited in claim 5, wherein the first and second display elements comprise a macromolecular dispersion type liquid crystal.

8. A viewfinder device as recited in claim 5, further comprising a third display element comprising the same material as the second display element, arranged in a clearance formed by a cut out portion of the first display element.

9. A viewfinder device as recited in claim 8, further comprising wiring passed through between the third display element and the first display element to apply a drive signal to the second display element.

10. A viewfinder device as recited in claim 5, further comprising a third display element comprising the same material as the second display element, arranged in a clearance formed by a cut out portion of the second display element.

11. A viewfinder device, comprising:
    a first visual field frame display element comprising a material that scatters light, and which displays a first visual field frame in a picture plane by obstructing a subject light beam;
    a second visual field frame display element comprising a material having a light transmitting state and a light obstructing state and which scatters light when in the light obstructing state, to display a second visual field frame within the visual field defined by the first visual field frame by obstructing the subject light beam;
    a first warning display element, arranged in a clearance formed by a cut-out portion of the first visual field frame display element, and comprising the same material as the second visual field frame display element;
    a second warning display element to perform a warning similar to the first warning display element, arranged in a clearance formed by cut out a portion of the second visual field frame display element, and comprising the same material as the second visual field frame display element;
    a changeover device to change the second visual field frame display element and first and second warning display elements between either the light transmitting state or the light obstructing state; and a control device to control changing of the first warning display element to the light obstructing state and the second warning display element to the light transmitting state to perform a warning when the second visual field frame display element is in the light transmitting state, and to control the first warning display element to the light transmitting state and the second warning display element to the light obstructing state to perform a warning when the second visual field frame display element is in the light obstructing state.

12. A viewfinder device as recited in claim 11, further comprising:

an irradiating device to irradiate light to the first and second visual field frame display elements and the first and second warning display elements, wherein light from the irradiating device is scattered in the each display element and is guided toward an eyepiece.

13. A viewfinder device as recited in claim 1, wherein the first and second visual field frame display elements and the first and second warning display elements comprise a macromolecular dispersion type liquid crystal.

14. A viewfinder device having an eyepiece, comprising:

a light obstructing visual field frame member having an aperture to form a visual field frame in a viewfinder picture plane;

a display element to display a visual field frame, and which is disposed more on the eyepiece side than the visual field frame member, and comprises material which scatters light;

a light guide device to guide light to the display element, wherein the display element, when seen from the eyepiece side, is positioned in a neighborhood of the boundary of the visual field and the visual field frame member, in a region obstructed by the visual field frame member, and the light guided by the light guide member is scattered by the display element and is guided toward the eyepiece.

15. A viewfinder device as recited in claim 14, wherein the display element comprises a macromolecular dispersion type liquid crystal.

16. A viewfinder device as recited in claim 14, further comprising;

a light transmitting member to accomodate the display element, wherein the visual field frame member comprises a vaporized material on a surface of an objective side of the light transmitting member.

17. A viewfinder device having an eyepiece, comprising:

a light obstructing visual field frame member having an aperture to form a visual field frame in the viewfinder picture plane;

a display element to display a visual field frame, the display element comprising a material which scatters light; and a light guide device to guide light to the display element, wherein the display element, when viewed from the eyepiece side, comprises a portion covered by the visual field frame member, and another portion exposed via the aperture of the visual field frame member, and the light from the light guide device, scattered by the display element, is guided toward the eyepiece.

18. A viewfinder device as recited in claim 17, further comprising:

a light transmitting member to accommodate the display element, wherein the visual field frame member comprises a vaporized material on a surface of the eyepiece side of the light transmitting member.

19. A viewfinder device as recited in claim 17, wherein the display element comprises a macromolecular dispersion type liquid crystal.

20. A viewfinder device as recited in claim 17, wherein the display element is located farther from the eyepiece than the visual field frame member.

* * * * *

UNITED STATES PATENT AND TRADEMARK OFFICE
CERTIFICATE OF CORRECTION

PATENT NO. : 6,240,257 B1
DATED : May 29, 2001
INVENTOR(S) : Akio Nishizawa et al.

It is certified that error appears in the above-identified patent and that said Letters Patent is hereby corrected as shown below:

Column 13,
Line 21, "claim 1" should be -- claim 11 --.

Signed and Sealed this

Twelfth Day of March, 2002

Attest:

JAMES E. ROGAN
*Attesting Officer*   *Director of the United States Patent and Trademark Office*